United States Patent
Chliwnyj et al.

(10) Patent No.: US 6,831,806 B2
(45) Date of Patent: Dec. 14, 2004

(54) APPARATUS AND METHOD TO CALIBRATE A SERVO SENSOR

(75) Inventors: Alex Chliwnyj, Tucson, AZ (US); David L. Swanson, Tucson, AZ (US); Steven C. Wills, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 10/185,540

(22) Filed: Jun. 27, 2002

(65) Prior Publication Data

US 2004/0001276 A1 Jan. 1, 2004

(51) Int. Cl.[7] .............................................. G11B 5/584
(52) U.S. Cl. ..................................................... 360/77.12
(58) Field of Search ............................. 360/77.12, 75, 360/78.02

(56) References Cited

U.S. PATENT DOCUMENTS

| | | | |
|---|---|---|---|
| 4,677,505 A | * 6/1987 | Nukada et al. ............ | 360/77.12 |
| 5,294,791 A | * 3/1994 | Pahr ........................ | 360/77.12 |
| 5,309,299 A | 5/1994 | Crossland et al. | |
| 5,457,586 A | * 10/1995 | Solhjell .................... | 360/77.12 |
| 5,574,602 A | * 11/1996 | Baca et al. ................ | 360/77.12 |
| 5,617,269 A | * 4/1997 | Gordenker et al. ........ | 360/77.12 |
| 5,726,824 A | 3/1998 | Ayres et al. | |
| 5,828,514 A | 10/1998 | Chliwnyj et al. ......... | 360/77.12 |
| 5,844,814 A | * 12/1998 | Chliwnyj et al. ......... | 360/77.12 |
| 5,901,008 A | * 5/1999 | Nayak et al. ............. | 360/78.02 |
| 5,923,494 A | * 7/1999 | Arisaka et al. ............ | 360/75 |
| 5,946,159 A | * 8/1999 | Chliwnyj et al. ......... | 360/77.12 |
| 5,956,199 A | * 9/1999 | Husky et al. ............. | 360/75 |
| 5,999,359 A | * 12/1999 | Fasen ...................... | 360/77.12 |
| 6,108,159 A | 8/2000 | Nute et al. ............... | 360/77.12 |
| 6,243,225 B1 | 6/2001 | Wyman et al. .......... | 360/77.12 |
| 6,462,899 B1 | * 10/2002 | Chliwnyj et al. ......... | 360/77.12 |
| 6,525,898 B1 | * 2/2003 | Chliwnyj et al. ......... | 360/77.12 |
| 6,661,600 B1 | * 12/2003 | Chliwnyj et al. ......... | 360/77.12 |
| 6,674,603 B2 | * 1/2004 | Basham et al. ........... | 360/77.12 |

* cited by examiner

*Primary Examiner*—Andrew L. Sniezek
*Assistant Examiner*—James L Habermehl
(74) *Attorney, Agent, or Firm*—Dale F. Regelman

(57) ABSTRACT

A method to calibrate a servo sensor disposed on a magnetic tape head disposed adjacent a magnetic tape moving along a tape path. The method measures a maximum and a minimum servo signal ratio, establishes target maximum and minimum servo signal ratios, and determines if the measured servo signal ratios include the target ratios. If the measured servo signal ratios include the target servo signal ratios, then the method forms a filtered servo signal waveform using the measured servo signal waveform. The method then uses the filtered servo signal waveform to calculate a transfer function which is saved for subsequent track following.

51 Claims, 14 Drawing Sheets

FIG. 2B

| HEAD TRACK NO. | HEAD MODULE | |
|---|---|---|
| | L | R |
| 1 | WR | RD |
| 2 | RD | WR |
| 3 | WR | RD |
| 4 | RD | WR |
| 5 | WR | RD |
| 6 | RD | WR |
| 7 | WR | RD |
| 8 | RD | WR |
| SERVO | LS1 | RS1 |
| SERVO | LS2 | RS2 |
| 9 | WR | RD |
| 10 | RD | WR |
| 11 | WR | RD |
| 12 | RD | WR |
| 13 | WR | RD |
| 14 | RD | WR |
| 15 | WR | RD |
| 16 | RD | WR |
| SERVO | LS3 | RS3 |
| SERVO | LS4 | RS4 |
| 17 | WR | RD |
| 18 | RD | WR |
| 19 | WR | RD |
| 20 | RD | WR |
| 21 | WR | RD |
| 22 | RD | WR |
| 23 | WR | RD |
| 24 | RD | WR |
| SERVO | LS5 | RS5 |
| SERVO | LS6 | RS6 |
| 25 | WR | RD |
| 26 | RD | WR |
| 27 | WR | RD |
| 28 | RD | WR |
| 29 | WR | RD |
| 30 | RD | WR |
| 31 | WR | RD |
| 32 | RD | WR |

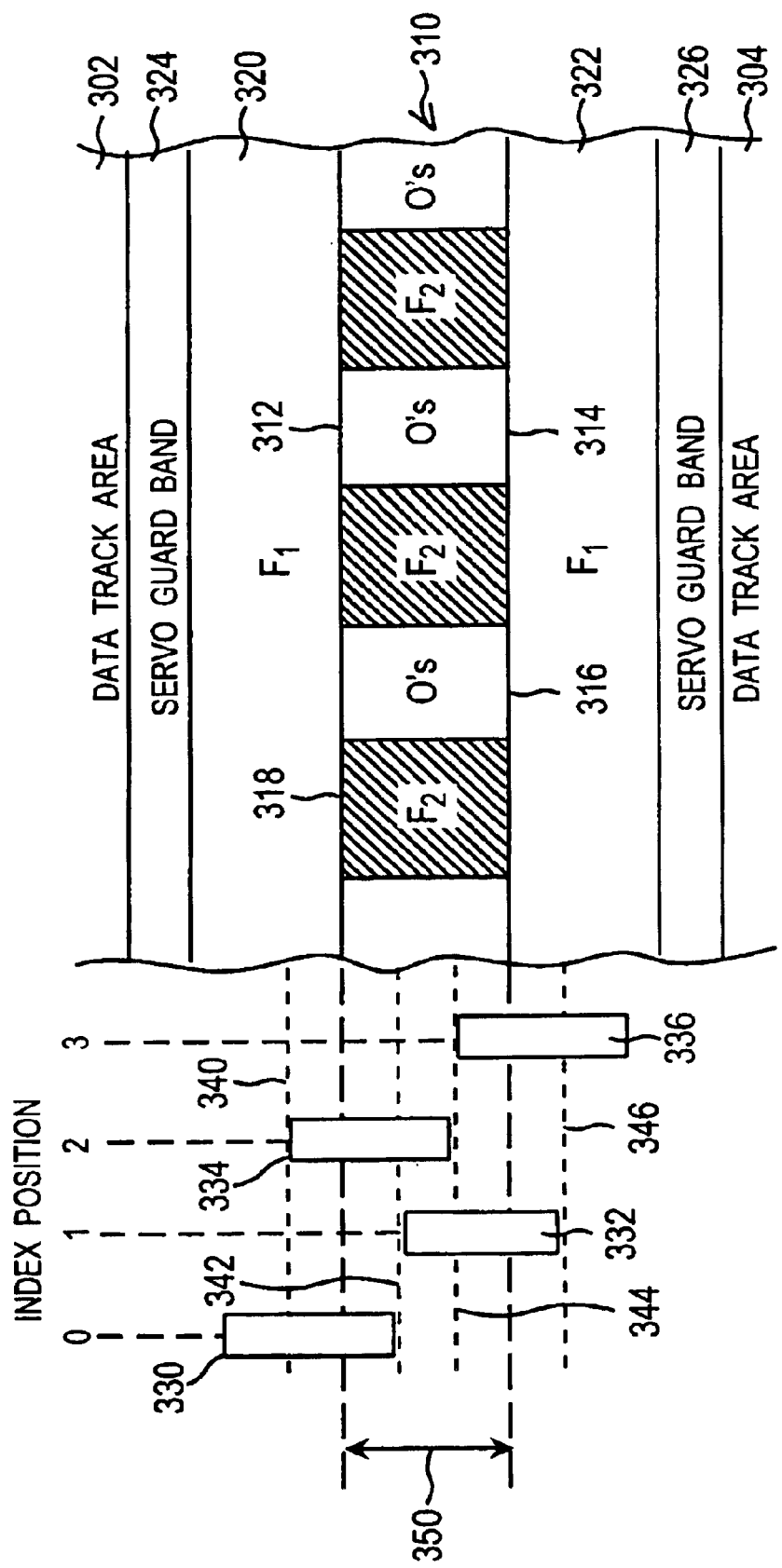

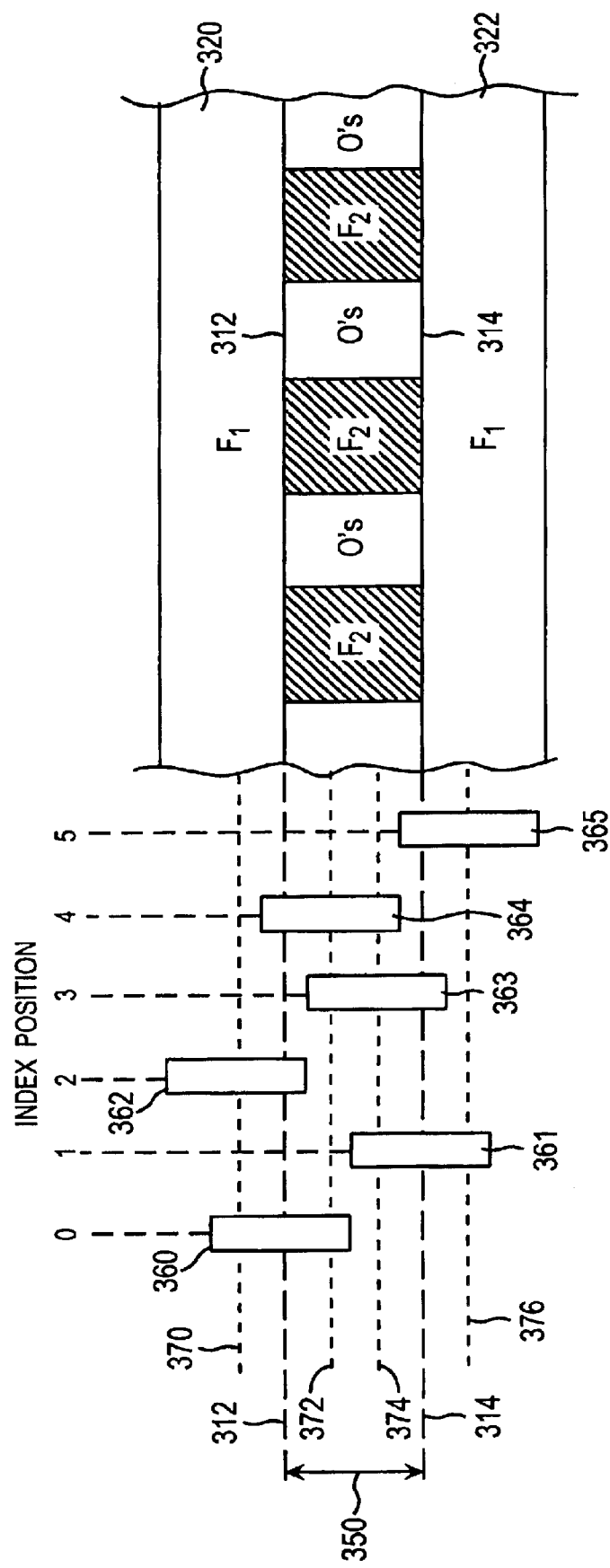

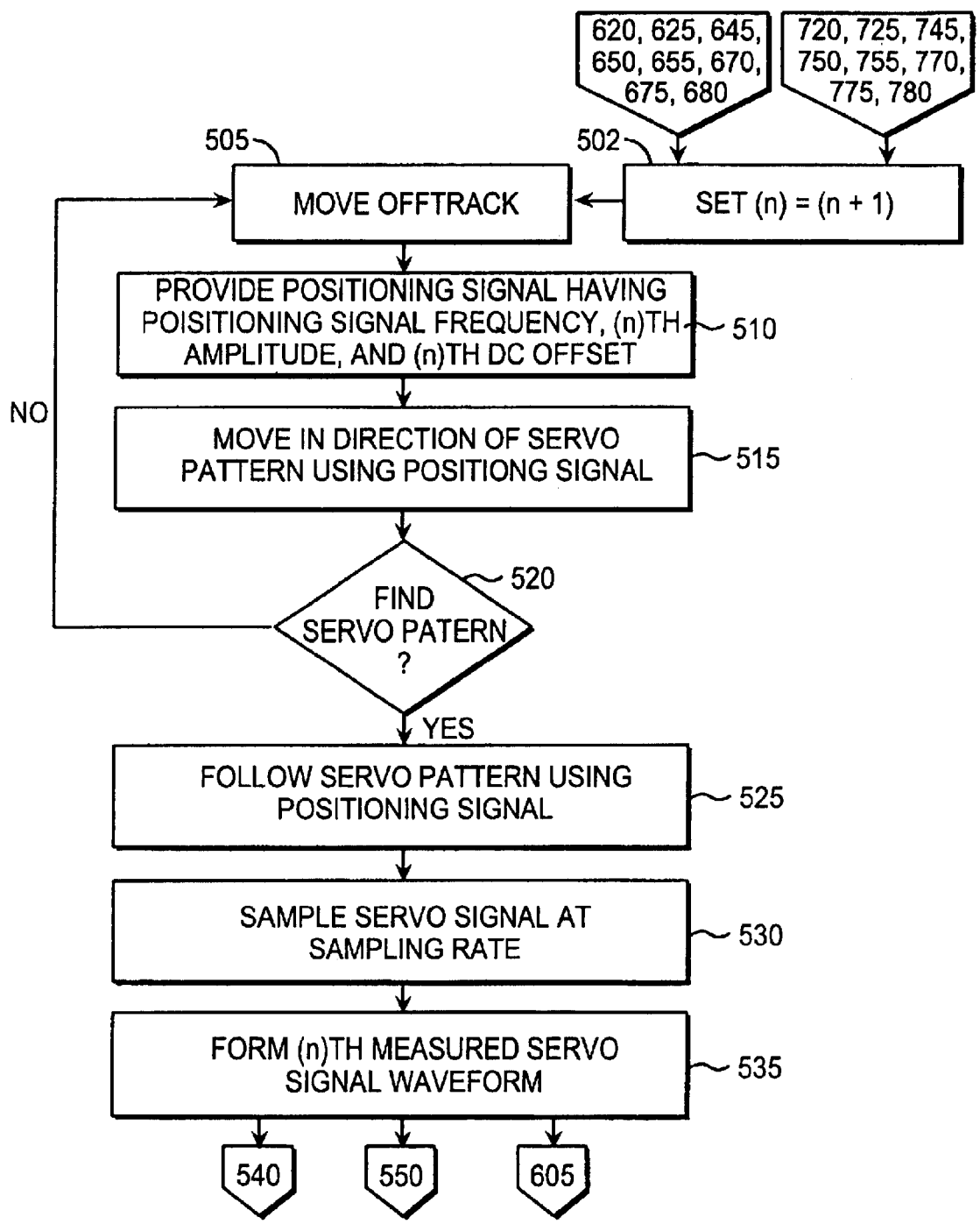

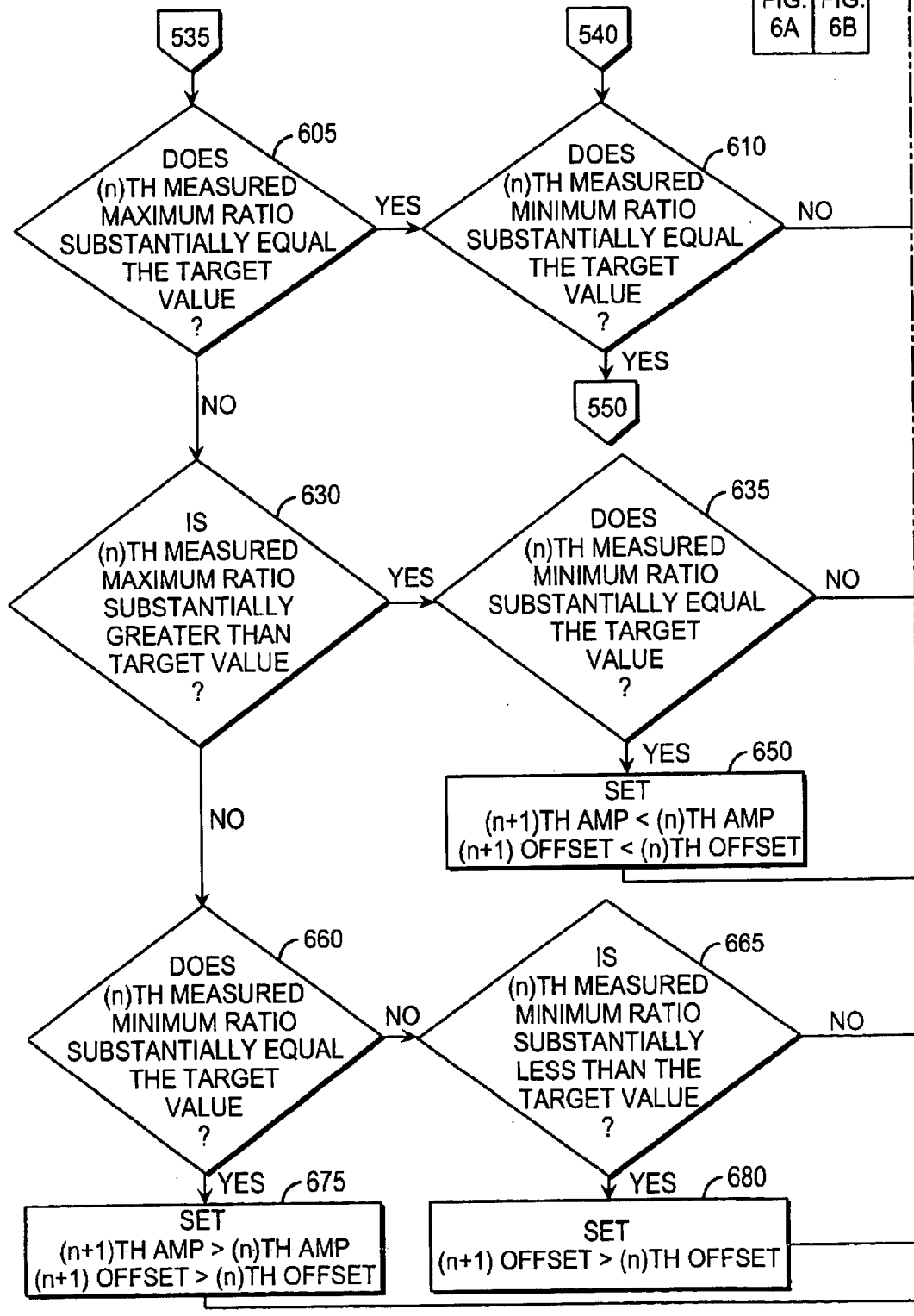

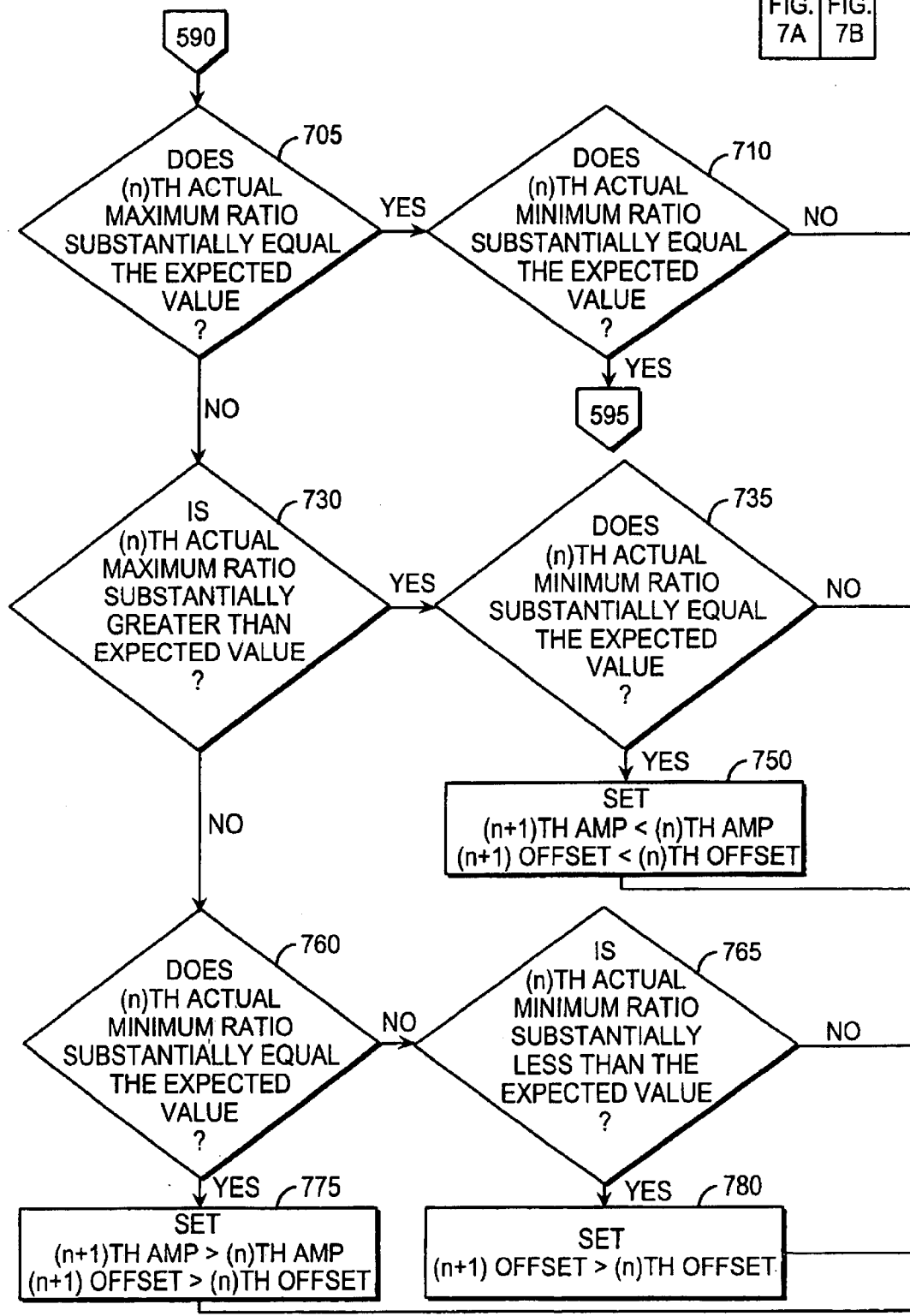

APPARATUS AND METHOD TO CALIBRATE A SERVO SENSOR

FIELD OF THE INVENTION

This invention relates to an apparatus and method to calibrate a servo sensor disposed on a magnetic tape head. In certain embodiments, this invention relates to servo track following a moving magnetic tape having one or more servo edges of dissimilar recorded servo signals, and, more particularly, to calibrating one or more servo sensors with respect to one or more indexed servo positions offset laterally from those one or more servo edges.

BACKGROUND OF THE INVENTION

Automated media storage libraries are known for providing cost effective access to large quantities of stored media. Tape cartridges containing a moveable magnetic tape are often used in automated data storage libraries. Tape media, such a magnetic tape, is a common medium for the storage of data to be utilized by a computer. Magnetic tape has found widespread use as a data storage medium because it provides a relatively inexpensive solution for storing large amounts of data.

Magnetic tape data storage typically provides one or more prerecorded servo tracks to allow precise positioning of a tape head with respect to those prerecorded servo tracks. Servo sensors disposed on the tape head are used to track the recorded servo tracks. The tape head comprises one or more read/write elements precisely positioned with respect to those servo sensors. One example of a magnetic tape system is the IBM 3590, which employs magnetic tape having prerecorded servo patterns that include three parallel sets of servo edges, each servo edge being an interface between two dissimilar recorded servo signals, each set of servo edges comprising one servo edge on each of opposite lateral sides of a middle recorded servo signal.

In certain embodiments, the tape head includes a plurality of servo sensors for each servo edge, with the result that the tape head may be stepped between those servo sensors, each positioning the read/write elements at different interleaved groups of data tracks. Typically, for a given servo pattern of a set of two servo edges, the outer servo signals are recorded first, and the center servo signal is recorded last, to provide the servo edges. The nominal separation distance between the servo edges of each set of servo edges is a certain distance, but there is variation in the magnetic separation between the servo edges, for example, due to the variation of the width of the physical write element which prerecords the servo pattern, due to variation in the magnetic characteristics of the physical write element, etc. The variation may occur between servo tracks in a single magnetic tape, and may occur between prerecording devices and therefore between magnetic tapes.

To reduce the apparent difference of the edge separation distance of the prerecorded servo tracks from nominal, the prerecording of the servo tracks is conducted at different amplitudes so as to attempt to compensate for the physical difference and provide a magnetic pattern that is closer to nominal. Thus, the difference in physical distance and the amplitude compensation may tend to offset each other with respect to the apparent distance between the servo tracks. These actions may provide an adequate signal for track following at the servo edges.

However, to increase track density, a servo sensor may be indexed to positions laterally offset from the linear servo edges to provide further interleaved groups of data tracks. The indexed positions are determined by measuring the ratio between the amplitudes of the two dissimilar recorded servo signals. Thus, when the amplitudes of the recorded servo signals are varied to compensate for physical distance variations, track following the prerecorded servo edges at the offset indexed positions becomes less precise. As the result, the data tracks may vary from the desired positions, i.e. be "squeezed" together, such that writing on one track with a write element that is subject to track misregistration (TMR) may cause a data error on the immediately adjacent data track.

The tape path of the above IBM 3590 is a guided tape path. In such a guided tape path embodiment, the magnetic tape can be moved in a first direction and an opposing second direction along a first axis, i.e. along the longitudinal axis of the tape. Movement of that tape along a second axis orthogonal to the first axis, i.e. the lateral axis of the tape, is minimized. Limiting the lateral movement of the magnetic tape results in generating minimal guiding noise, and therefore, the step from a first ratio of servo signals to a second ratio is readily discernible.

Another approach, however, is required for open channel guiding in which the magnetic tape can move laterally a distance which is substantially greater than the separation between index positions, thereby introducing substantial noise into the guiding process. The guiding signal to noise ratio thus becomes negative, with the guiding noise being far larger than the step from one ratio to another, making it difficult to gather data points with a monotonic slope to conduct a calibration of the servo ratios.

SUMMARY OF THE INVENTION

Applicants' invention includes a method and apparatus to calibrate a servo sensor disposed on a magnetic tape head disposed adjacent a magnetic tape moving along a tape path, where the magnetic tape includes at least one servo edge comprising an interface between a first recorded signal and a second recorded signal, and where that servo sensor detects the first recorded signal and the second recorded signal, and where an independent position sensor provides an IPS signal comprising the lateral position of the tape head with respect to the tape path. Applicants' method includes providing a positioning signal, where the positioning signal comprises a positioning signal frequency, an amplitude, and a DC offset. Applicants' method moves said tape head alternatingly in a first direction and an opposing second direction along a first axis as the tape moves along a second axis, where the first axis and the second axis are substantially orthogonal, and such that the position of the magnetic head along the first axis as a function of time is determined by the positioning signal.

Applicants' method further provides a servo signal, where that servo signal comprises the ratio of the detected first recorded signal and the detected second recorded signal. Applicants' method forms a measured servo signal waveform from that servo signal, where the measured servo signal waveform comprises a measured maximum servo signal ratio and a measured minimum servo signal ratio.

Applicants' method further includes establishing a target maximum servo signal ratio for the measured servo signal waveform, and a target minimum servo signal ratio for the measured servo signal waveform. Applicants' method then determines if the measured maximum servo signal ratio substantially equals the target maximum servo signal ratio, and if the measured minimum servo signal ratio substantially equals said target minimum servo signal ratio. If the measured maximum servo signal ratio substantially equals the target maximum servo signal ratio, and if the measured minimum servo signal ratio substantially equals said target minimum servo signal ratio, then Applicants' method forms a filtered servo signal waveform using the measured servo signal waveform.

Applicants' method further includes providing an IPS signal, forming a measured IPS signal waveform, and forming a filtered IPS signal waveform. Applicants' method then uses the filtered servo signal waveform and the filtered IPS signal waveform to form an X/Y datapoint array.

Applicants' method further uses that X/Y datapoint array to calculate a transfer function, and then saves that transfer function for subsequent use.

Applicants' invention further includes an article of manufacture comprising a computer useable medium having computer readable program code disposed therein to calibrate a servo sensor. Applicants' invention further includes a computer program product usable with a programmable computer processor having computer readable program code embodied therein to calibrate a servo sensor.

BRIEF DESCRIPTION OF THE DRAWINGS

The invention will be better understood from a reading of the following detailed description taken in conjunction with the drawings in which like reference designators are used to designate like elements, and in which:

FIG. 2B is a block diagram showing one embodiment of a magnetic tape head;

FIG. 3A is a detailed diagrammatic representation of a magnetic tape format providing four servo index positions in one set of two linear servo edges of the magnetic tape of FIG. 2A;

FIG. 3B is a detailed diagrammatic representation of a magnetic tape format providing six servo index positions in one set of two linear servo edges of the magnetic tape of FIG. 2A;

FIG. 5A is a flow chart summarizing the initials steps of Applicants' method;

DETAILED DESCRIPTION OF THE PREFERRED EMBODIMENTS

This invention is described in preferred embodiments in the following description with reference to the Figures, in which like numbers represent the same or similar elements. The invention will be described as embodied in an apparatus and method to calibrate servo sensors tracking servo signals recorded on a magnetic tape.

Figure 1:
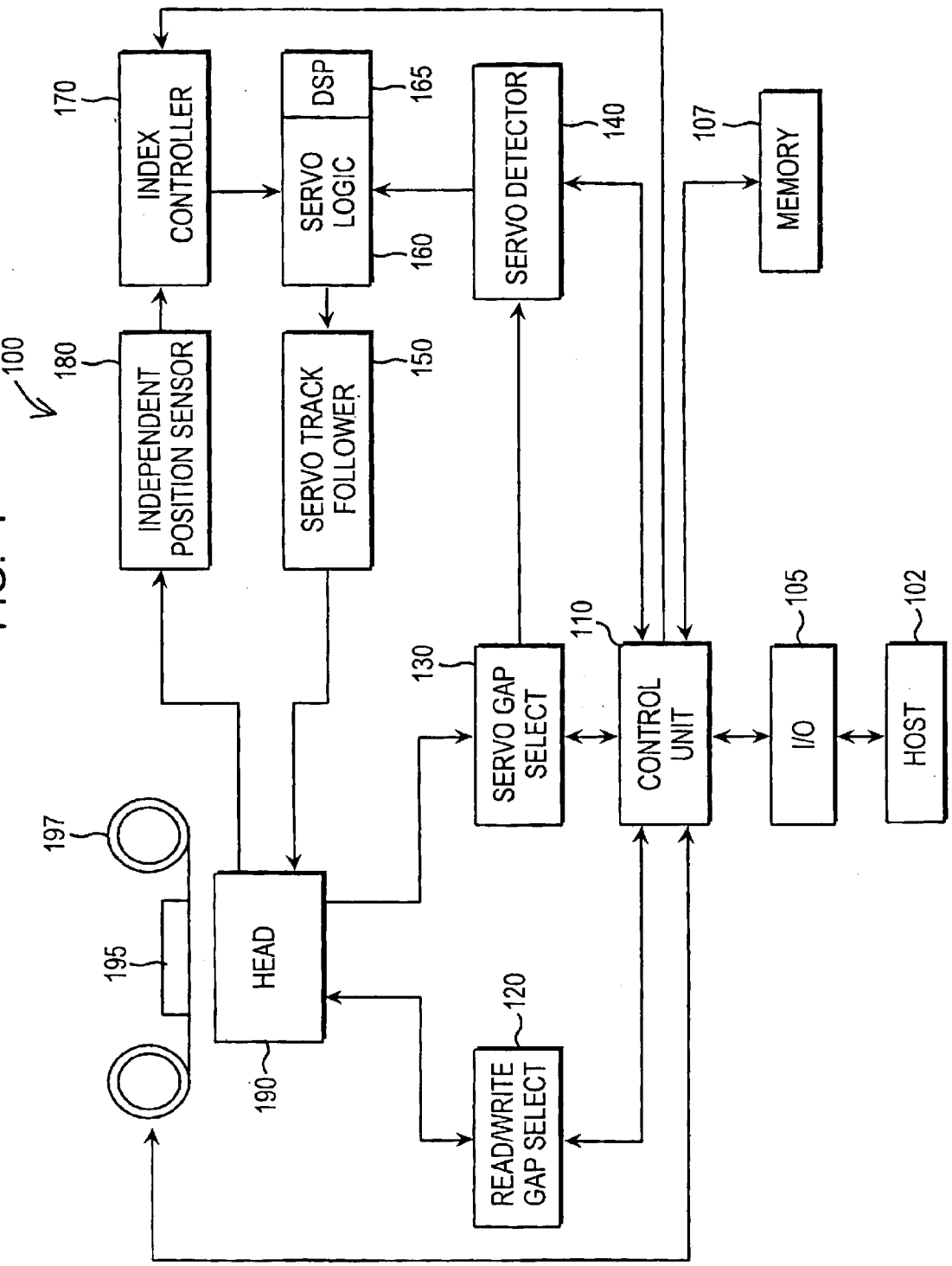
FIG. 1 is a block diagram of an embodiment of a magnetic tape system employing the present invention for calibration of servo index positions.

FIG. 1 shows magnetic tape data storage system 100. Control unit 10 receives and transmits data and control signals to and from a host device 102 via an interface 105. The control unit 110 is coupled to a memory device 107, such as a random access memory for storing information and computer programs. An example of a host device 102 comprises an IBM RS/6000 processor.

Figure 2A:
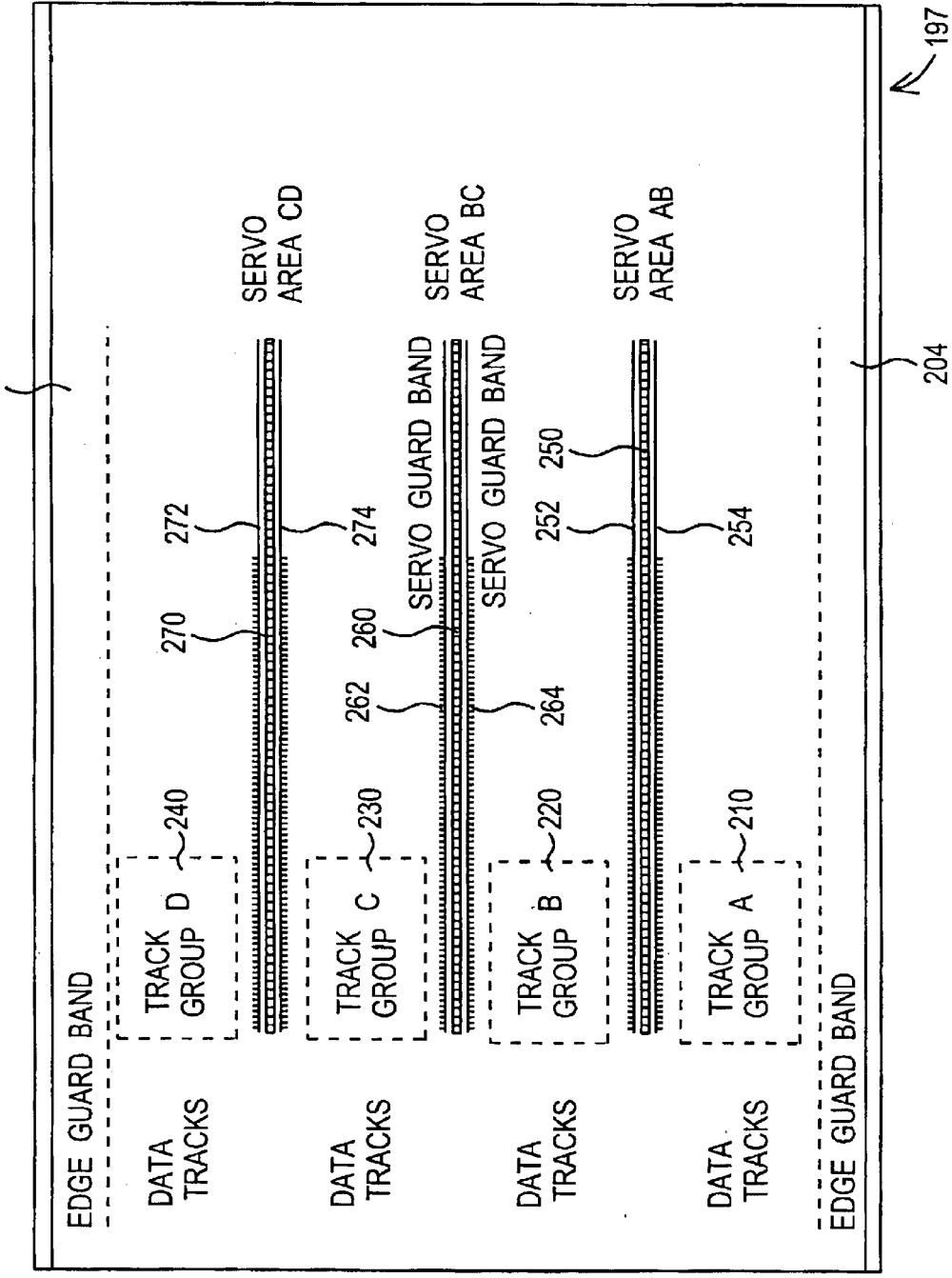
FIG. 2A is a diagrammatic illustration of a magnetic tape having three parallel sets of linear servo edges, each servo edge comprising an interface between two dissimilar recorded servo signals.

A multi-element tape head 190 includes a plurality of read/write elements to record and read information onto and from a magnetic tape 197, and servo sensors to detect servo signals comprising prerecorded linear servo edges on the magnetic tape 197. In certain embodiments, magnetic tape head 190 comprises a thin-film magneto-resistive transducer. In an illustrative embodiment, tape head 190 may be constructed as shown in FIG. 2B. The length of the tape head 190 substantially corresponds to the width of the tape 197. In certain embodiments tape head 190 includes thirty-two read/write element pairs (labeled "RD" and "WR") and three sets of servo read elements (e.g. LS1 272, RS6 298) corresponding to the three servo areas AB (FIG. 2A), BC (FIG. 2A), and CD (FIG. 2A). In the illustrated embodiment, the thirty-two read/write element pairs are divided into groups of eight, adjacent groups being separated two tracks occupied by a group of four servo sensors. Each group of four servo sensors may be referred to as a "servo group", e.g. servo group 255, servo group 265, and servo group 275.

In the illustrated embodiments, tape head 190 includes left and right modules separately fabricated, then bonded together. Write and read elements alternate transversely down the length of each module (i.e., across the width of the tape), beginning with a write element in position on the left module and a read element in the corresponding position on the right module. Thus, each write element in the left module is paired with a read element in the corresponding position on the right module and each read element in the left module is paired with a write element in the corresponding position on the right module such that write/read element pairs alternate transversely with read/write element pairs.

A tape reel motor system (not shown in FIG. 1) moves the tape 197 along a tape path in a first direction, and optionally in an opposing second direction, along a first axis, i.e. the longitudinal axis of the tape, while it is supported by a tape deck 195 for reading and writing. The tape deck 195 does not precisely hold the tape in position laterally. Rather, open channel guiding may be employed in which the magnetic tape can move laterally a distance which is substantially greater than that between index positions, thereby introducing substantial noise into the guiding process. The guiding signal to noise ratio thus becomes negative, with the guiding noise being far larger than the step from one ratio to another, making it difficult to gather data points with a monotonic slope to conduct a calibration of the detected servo signal ratios.

A servo track follower 150 directs the motion of the magnetic tape head 190 in a lateral or transverse direction relative to the longitudinal direction of tape motion. The control unit 110 is coupled to one or more tape reel motors and controls the direction, velocity and acceleration of the tape 197 in the longitudinal direction.

The data tracks on the tape 197 are arranged in parallel and are parallel to the linear servo edges. Thus, as the servo track follower 150 causes the servo sensors of the magnetic tape head to track follow a linear servo edge or a servo index position laterally offset from a servo edge, the read/write elements track a parallel group of the data tracks. If it is desired to track another parallel group of data tracks, the magnetic tape head 190 is indexed laterally to another servo edge or to another servo index position, or a different servo sensor is aligned with the same or a different servo edge or servo index position.

When the magnetic tape head 190 is to be moved to a selected index position, an index controller 170 is enabled by the control unit 110, receiving a lateral position signal from an independent position sensor 180 and transmits an appropriate signal to servo logic 160 to select the appropriate servo track, while the control unit 110 transmits an appropriate signal to a servo gap selector 130 to select the appropriate servo sensor. The independent position sensor 180 is discussed in the incorporated U.S. Pat. No. 5,946,159, where it is called a non-servo position sensor, and indicates the lateral mechanical position of the tape head 190 with respect to the tape deck 195.

Over the course of longer distances of longitudinal tape movement, the open channel guiding system will allow the tape to move laterally with respect to the tape deck 195. In accordance with the present invention, the independent position sensor 180, in limited distances of tape movement, accurately tracks the lateral mechanical position of the tape head 190, and therefore of the servo sensor(s), with respect to the magnetic tape 197 and of the servo edges. The logic 160 operates the servo track follower 150 in accordance with the present invention to calibrate the servo index positions as sensed by the servo sensor with respect to the parallel sets of linear servo edges, as will be explained. The logic 160 may comprise a programmed PROM, ASIC or microprocessor.

The tape system 100 may be bidirectional, in which ones of the read/write elements are selected for one direction of longitudinal tape movement, and others of the read/write elements are selected for the opposite direction of movement. The control unit 110 additionally selects the appropriate ones of the read/write elements by transmitting a signal to a read/write gap select unit 120.

Once a servo edge or edges are selected, the servo gap selector 130 provides the servo signals to a servo detector 140, which information is employed by servo logic 160 to position the tape head 190 to track follow the detected edges. In accordance with the present invention, servo logic 160 employs the servo information sensed by the servo detector 140 and the mechanical positioning information from the independent position sensor 180 to calibrate the track following servo. The track following servo logic is also implemented in the servo logic 160 employing the sensed servo signals to determine the ratios of the sensed servo signals, which are employed in accordance with the present invention to calibrate the servo index positions of the track following servo 150.

Referring to FIG. 2A, a plurality, for example, three, parallel sets of linear servo edges 250, 260 and 270 are illustrated, each servo edge comprising an interface between two dissimilar recorded servo signals, each set of servo edges comprising one of the servo edges on each of opposite lateral sides of a middle recorded servo signal. As an example, a corresponding plurality of laterally offset servo sensors, i.e. servo sensor groups 255 (FIG. 2B), 265 (FIG. 2B), 275 (FIG. 2B), are disposed on tape head 190 to sense the servo signals at each corresponding edge. Additional pluralities of servo sensors, i.e. sensors 272, 274, 276, 278, may be provided to allow positioning of the tape head at additional data tracks.

Referring to FIG. 3A, the typical magnetic tape format of servo signals to form linear servo edges 312 and 314 comprising an interface between two dissimilar recorded servo signals is illustrated. One set of servo edges comprises outer bands 320 and 322, having a recorded pattern of a constant amplitude signal of a single frequency, on either side of an inner band 310 of the other servo signal, having a recorded pattern alternating between a constant amplitude burst signal 318 of a single second frequency and a zero amplitude null signal 316. Typically, the servo signals 320, 310 and 322 are provided with servo guard bands 324 and 326 to protect the outer bands 320 and 322 from noise resulting from the data track areas 302 and 304.

It is desirable that the servo edges are separated by a predetermined nominal distance 350 employed for prerecording the servo signals. Typically, the outer servo signals 320, 322 are recorded first, and the center servo signal 310 is recorded last, to provide the servo edges 312, 314. There is, typically, variation in the magnetic separation 350 between the servo edges, for example, due to the variation of the width of the physical write element which prerecords the servo pattern, due to variation in the magnetic characteristics of the physical write element, etc. The variation may occur between servo tracks in a single magnetic tape, and may occur between prerecording devices and therefore between magnetic tapes.

To reduce the apparent difference of the edge separation 350 distance of the prerecorded servo tracks from nominal, the prerecording of the servo signals is conducted at different amplitudes so as to attempt to compensate for the physical difference and provide a magnetic pattern that is closer to nominal. Additionally, three servo sensors are employed to simultaneously sense the three servo tracks. Thus, the difference in physical distance and the amplitude compensation may tend to offset each other with respect to the resultant apparent distance between the servo tracks. These actions may provide an adequate signal for track following at the servo edges.

However, to increase data track density, in the embodiment of FIG. 3A four servo index positions, i.e. index positions 0, 1, 2, and 3, are calibrated. These index positions are laterally offset with respect to the sensed servo edges of the set of linear servo edges. Index position 0 corresponds to placement of sensor 330 over tape track position 340. Similarly, index positions 1, 2, and 3, respectively, correspond to placement of sensors 332, 334, and 336, respectively, over tape track positions 342, 344, and 346, respectively. The relative positions of these four index positions are: 0, 2, 1, 3.

As an example, the servo index positions may be offset laterally about one quarter the width of the inner band 310 away from the servo edge in either direction, providing four index positions. Servo sensors 330, 332, 334 and 336 are provided and are substantially the same sensing width as the predetermined distance 350. The indexed positions are determined by measuring the ratio between the amplitudes of the two dissimilar recorded servo signals, e.g., as measured by the servo detector 140 of FIG. 1, and called the "position error signal", or "PES". The servo logic 160 operates the servo track follower 150 to track follow at the desired measured ratio. For example, the measured ratio will be the ratio between the sum of the sensed outer band signal 320 plus the inner band signal 318, and the sensed outer band signal 320, giving effect to the null 316. The illustrations and descriptions herein employ this ratio.

Alternatively, the measured ratio may be the ratio between the outer band signal 320 at frequency F1 and the inner band signal 318 at frequency F2. In order to center the data read/write elements at each of the servo index positions, the ratios must be measured precisely. Thus, when the amplitudes of the recorded servo signals are varied to compensate for physical distance variations, the measured ratios are distorted and track following the prerecorded servo edges at the offset indexed positions becomes less precise. As the result, the data tracks may vary from the desired positions, for example, squeezed together, such that writing on one track with a write element that is subject to track misregistration (TMR) may cause a data error on the immediately adjacent data track.

FIG. 3B illustrates another embodiment of displaced index positions that may be employed with the present invention. This embodiment includes six index positions, i.e. index positions 0, 1, 2, 3, 4, and 5. At the "0" or "1" index positions, the servo element is located at position 360 centered on servo edge 312 or at position 361 centered on servo edge 314. Additional index positions are provided which are aligned such that a servo element is displaced from an edge 312 or 314 in either direction. As the result, the number of index positions becomes six. The relative positions of these six index positions are: 2, 0, 4, 3, 1, 5.

In order to center the data read/write elements in the "2" and "5" index positions, the servo read element must be located at position 362 or at position 365, and will read a minimum signal that has an amplitude ratio of about 5/6 of the maximum signal, and to center the data read/write elements in the "3" and "4" index positions, the servo read element must be located at position 363 or at position 364, and will read a minimum signal that has an amplitude ratio of about 1/6 of the maximum signal. Thus, referring additionally to FIGS. 11 and 12, the servo logic 160 will calibrate different sets of position error signals representing different ratios along curves 1110 (FIG. 11)/1140 (FIG. 11), or along curves 1210(FIG. 12)/1240 (FIG. 12) for determining the displacements of the servo index positions, including the on-edge positions 360 and 361 for the servo edges.

To track follow an edge or edges, once a servo edge or edges are selected, the servo gap selector 130 of FIG. 1 provides the servo signals to a servo detector 140, which digitally detects the servo signals at a predetermined sample rate, and provides servo signal ratios of each of the selected servo sensors. The servo logic 160 employs the servo signal ratios to determine the displacement from the edges and operates the servo loop servo track follower 150 to position the tape head 190 to track follow at the desired displacement from the edges.

Figure 4A:
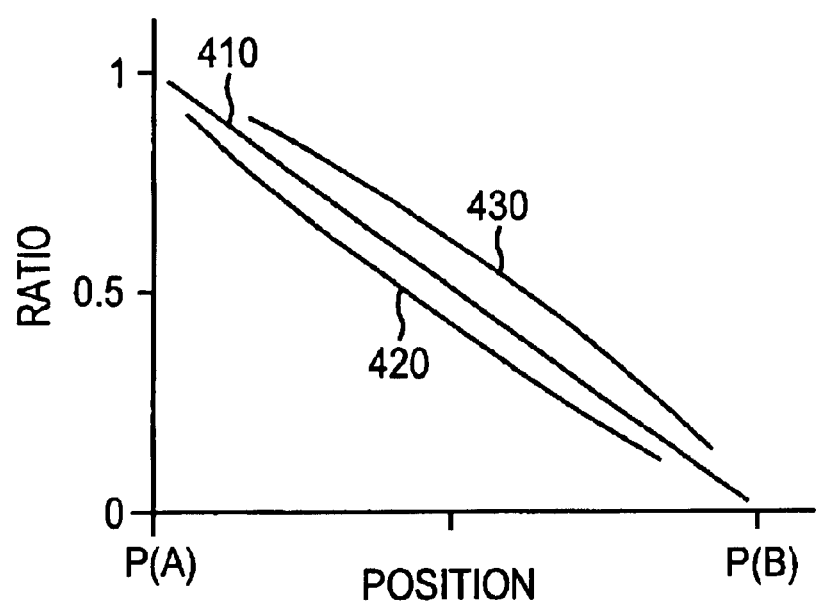
FIG. 4A is a diagrammatic representation of three examples of the ratios between the sensed servo signals of a servo edge of FIG. 2A at various lateral positions, where the recorded servo signals generating the edge are of three different amplitudes.

FIG. 4A illustrates examples of distortion of the measured ratios between the sensed servo signals of one linear servo edge, at various lateral positions of the servo sensors. Referring additionally to FIGS. 3A and 3B regarding servo sensor placement, in an ideal relationship, the ratio of signals varies linearly from a value of "1" when the servo sensor is at position $P_{(A)}$, which is centered on and senses only the outer band 320 or outer band 322, to a value of "0" when the servo sensor is at position $P_{(B)}$, which is centered on and senses only the inner band 310. Straight line 410 graphically illustrates such an ideal relationship.

Figure 4B:
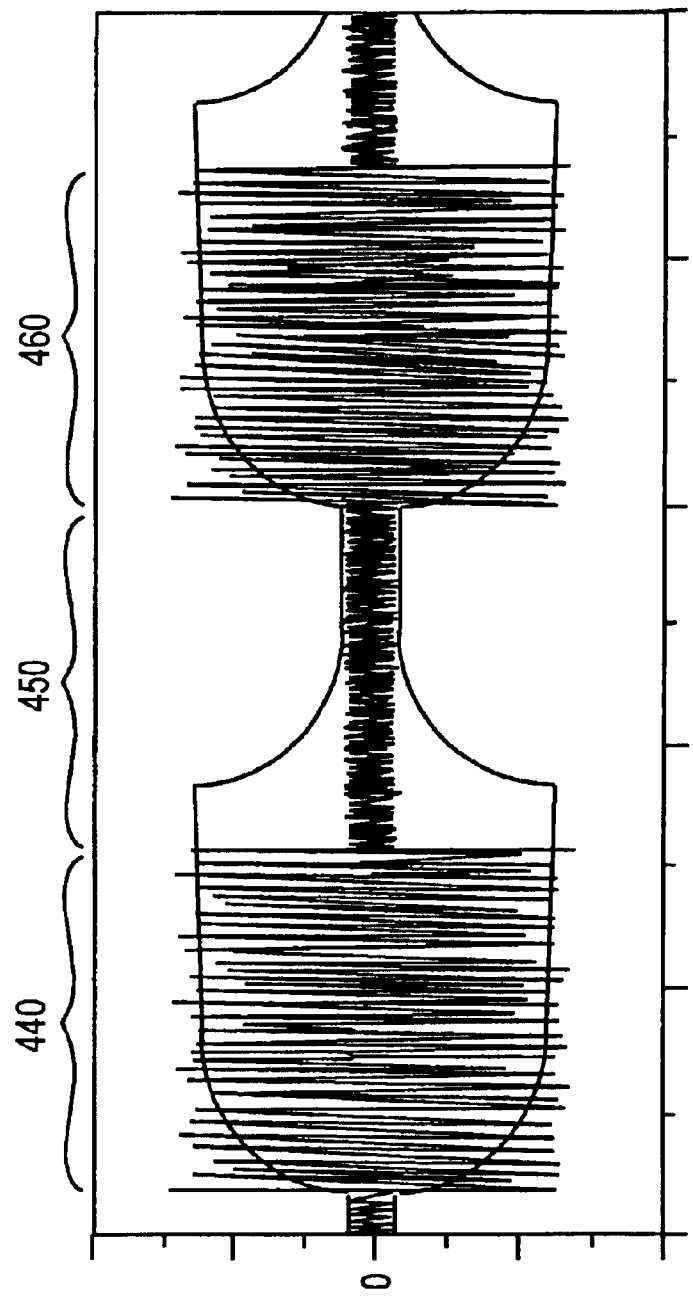
FIG. 4B shows analog servo signals detected at a first index position.
Figure 4C:
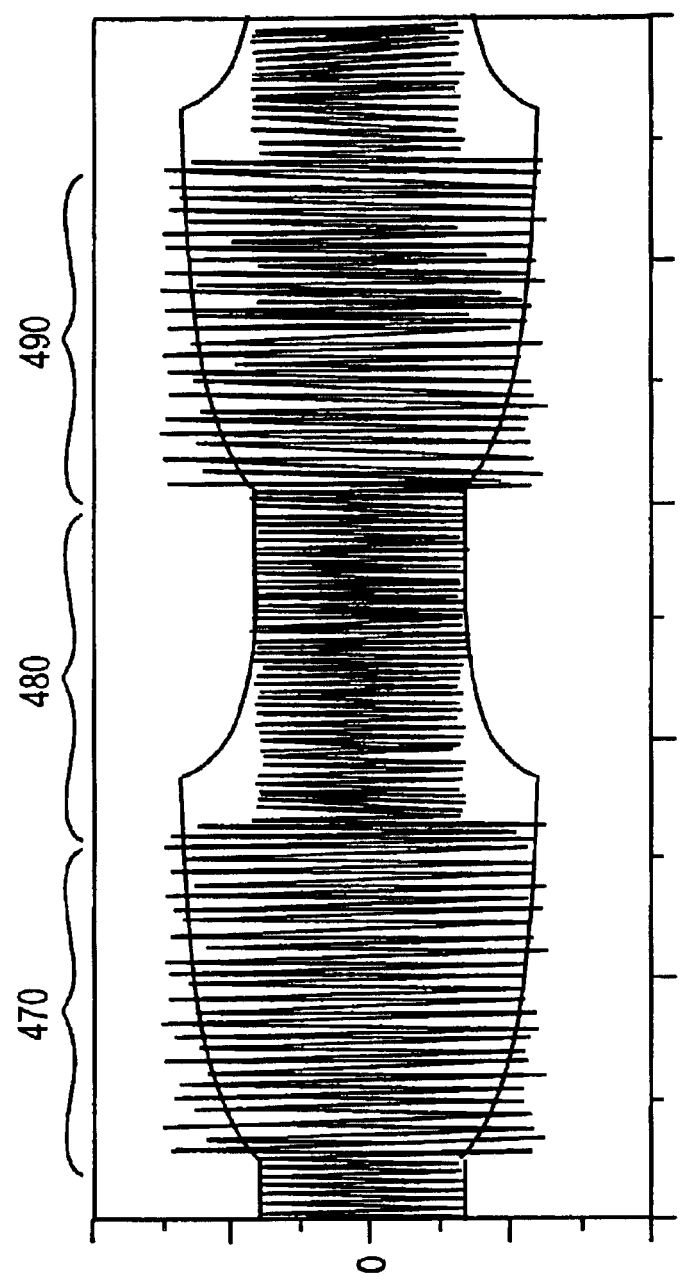
FIG. 4C shows analog servo signals detected at a second index position.

Curve 420 comprises a graphical representation of more typical ratios of servo signals, where the center recorded servo signal 310 generating the edges is of a relatively weak amplitude. FIGS. 4B and 4C illustrate wave forms of the analog signal from the servo transducer at, respectively, positions 332 and 334 of FIG. 3A. Thus, in FIG. 4B, the bursts 440 and 460 formed while the servo transducer is at position 332 of FIG. 3A from the combination of the first frequency and the second frequency burst is at a high amplitude, but the burst 450 formed from the combination of the first frequency and the null signal is at a very low amplitude because only a small portion of the servo transducer is positioned over the first frequency. In FIG. 4C, the bursts 470 and 490 formed while the servo transducer is at position 336 of FIG. 3A from the combination of the first frequency and the second frequency burst is at a high amplitude, as is the burst 480 formed from the combination of the first frequency and the null signal, because the servo transducer is positioned primarily over the first frequency.

Referring again to FIG. 4A, curve 430 comprises a graphical representation of more typical ratios of servo signals as a function of servo sensor location, where the center recorded servo signal 310 generating the edges is of a relatively strong amplitude. As those skilled in the art will appreciate, curve 430 does not define a linear relationship between the ratio of measured servo signals and servo sensor placement. In light of the differing, and complex, relationship between the ratio of measured servo signals as a function of servo sensor location, employing the same ratio setting to position the tape head at various servo index positions for each of the linear edges may result in track misregistration.

In certain embodiments, the tape deck 195 in FIG. 1 does not precisely hold the tape in position laterally. Rather, open channel guiding may be employed whereunder the magnetic tape can move laterally a distance which is substantially greater than that between index positions, e.g., index positions 340–346 of FIG. 3A and index positions 370, 312, 372, 374, 314, and 376 of FIG. 3B, thereby introducing substantial noise into the guiding process. The guiding signal to noise ratio thus becomes negative, with the guiding noise being far larger than the step from one ratio to another, making it difficult to gather data points with a monotonic slope to conduct a calibration of the detected servo signal ratios.

In one embodiment of the present invention, servo logic 160 is provided with digital signal processor 165, and is coupled to the servo detector 140, the servo track follower 150, and the independent position sensor 180, all of FIG. 1. The logic 160 operates the servo loop, comprising servo gap selector 130, servo detector 140, and servo track follower 150, to inject a defined signal to modulate the lateral position of the head and, thereby, a plurality of servo sensors.

Figure 5B:
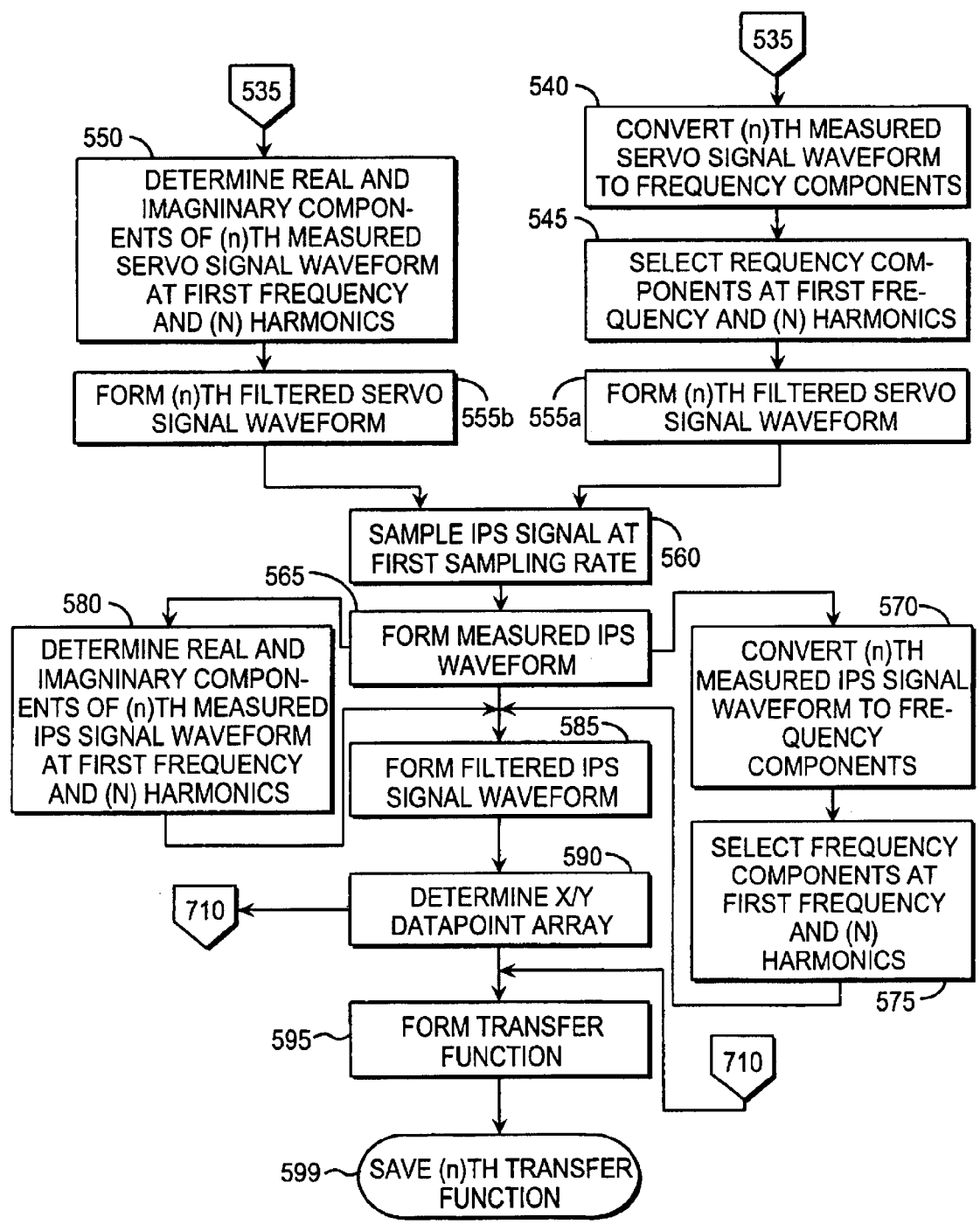
FIG. 5B is a flow chart summarizing certain additional steps in Applicants' method.

FIG. 5A summarizes the initial steps in Applicants' method to calibrate a servo sensor. In step 505, Applicants' method causes the tape head to move such that the servo sensor is not aligned with a servo edge. In certain embodiments, step 505 is performed by servo logic, such as logic 160. In step 510, Applicants' method establishes a positioning signal to use in servo sensor calibration. The positioning signal comprises a positioning signal frequency, an amplitude, and a DC offset. Applicants' method comprises an iterative process, wherein in certain embodiments the (n)th transfer function formed in step 590 (FIG. 5B) is subsequently used to determine the (n+1)th positioning signal in step 510.

In step 515, Applicants' method operates the servo loop to move in the direction of the servo pattern, such as pattern 250 (FIG. 2A), 260 (FIG. 2A), or 270 (FIG. 2A), in order to find and lock to the pattern. In certain embodiments, step 515 is performed by logic 160. Applicants' method transitions from step 515 to step 520 wherein Applicants' method determines if the servo pattern is found. If Applicants' method determines in step 520 that the servo pattern has not been found, then Applicants' method transitions from step 520 to step 505 to repeat the movement off-track.

Alternatively, if Applicants' method determines in step 520 that the servo pattern has been located, Applicants' method transitions from step 520 to step 525 wherein Applicants' method causes the servo loop to laterally position the servo sensor to detect the servo signals at continually altered digital set points of the ratios of the sensed servo signals. In certain embodiments, step 525 is performed by logic 160. The set points are altered at the sample rate of the servo loop, and are altered to inject the positioning signal of step 510, whereby the servo loop track follows the linear servo edges, e.g., edges 312 or 314 of FIGS. 3A and 3B at each of the parallel sets of linear servo edges 250 (FIG. 2A), 260 (FIG. 2A), 270 (FIG. 2A), with the corresponding plurality of laterally offset servo sensors, i.e. sensor groups 255 (FIG. 2B), 265 (FIG. 2B), 275 (FIG. 2B), at the continually altered digital set points.

This predetermined positioning signal comprises a sinusoidal pattern having a known positioning signal frequency, a known first amplitude, and a known first DC offset. In certain embodiments, the positioning signal is varied according to an algorithm disposed in logic 160. In certain embodiments, the positioning signal frequency is set in "firmware" disposed in DSP 165. In certain embodiments, the positioning signal frequency is set by the user during system initialization. In certain embodiments, the positioning signal frequency is set by field service personnel during system initialization. In certain embodiments, the positioning signal frequency is modified by Applicants' method in order to further refine the calibration of the servo sensors disposed in the system.

The positioning signal of step 510 comprises a positioning signal frequency selected such that the positioning signal frequency, and major harmonics thereof, each differs from intrinsic operational frequencies of the track following servo system and/or of the tape drive. As examples, the positioning signal is selected so that the positioning signal frequency and major harmonics thereof differ from the frequencies of the tape reels 197 of FIG. 1, the tape motor(s), and the cooling, fans, and any resonant frequencies of the servo system.

In certain embodiments, the positioning signal is modulated such that the ratio of sensed servo signals, i.e. the ratio of the detected amplitudes of F1 and F2, varies from a ratio about 0.1 to a ratio of about 0.9. The servo signals detected is dominated by the sinusoidal pattern and not by the tape movement. The frequency of the positioning signal, i.e. the positioning signal frequency, is known precisely, and signals not having that positioning signal frequency, or harmonics of that positioning signal frequency, comprise noise in the measurement.

Applicants' method transitions from step 525 to step 530 wherein Applicants' method samples the servo signal provided by the servo detector at the predetermined sampling rate. In certain embodiments, step 530 is performed by servo logic, such as logic 160. Applicants' method transitions from step 530 to step 535 wherein the data collected in step 530 is used to form the (n)th measured servo signal waveform. In certain embodiments, step 530 is performed by servo logic, such as logic 160. The digitized measured servo signal waveform of step 530 is dominated by the sinusoidal pattern having the positioning signal frequency, and not by the tape movement. The frequency of the positioning signal frequency is known precisely, and anything that is not at that positioning signal frequency, or its harmonics, comprises noise in the measurement.

In certain embodiments, Applicants' method transitions from step 535 to steps 540 (FIG. 5B), 545 (FIG. 5B), and 555a (FIG. 5B), wherein the measured servo signal waveform of step 535 is used to form a filtered servo signal waveform using Fast Fourier transforms/Inverse Fast Fourier transforms. In certain embodiments, Applicants' method transitions from step 535 to steps 550 (FIG. 5B) and 555b (FIG. 5B), wherein Applicants' method forms a filtered servo signal waveform using the real and imaginary components of the measured servo signal waveform of step 535.

As discussed above, Applicants' method calibrates a servo sensor using, inter alia, detected servo signal ratios. In certain embodiments, Applicants' method includes comparing the (n)th measured servo signal waveform of step 535 with a predetermined target maximum servo signal ratio and a pre-determined target minimum servo signal ratio. In certain embodiments, the target maximum servo signal ratio and the target minimum servo signal ratio are set in "firmware" disposed in servo logic, such as logic 160 (FIG. 1). In certain embodiments, the target maximum servo signal ratio and the target minimum servo signal ratio are set by the user during system initialization. In certain embodiments, the target maximum servo signal ratio and the target minimum servo signal ratio are set by field service personnel during system initialization. In certain embodiments, the target maximum servo signal ratio and the target minimum servo signal ratio are modified by Applicants' method in order to further refine the calibration of the servo sensors disposed in the system.

Figure 6B:
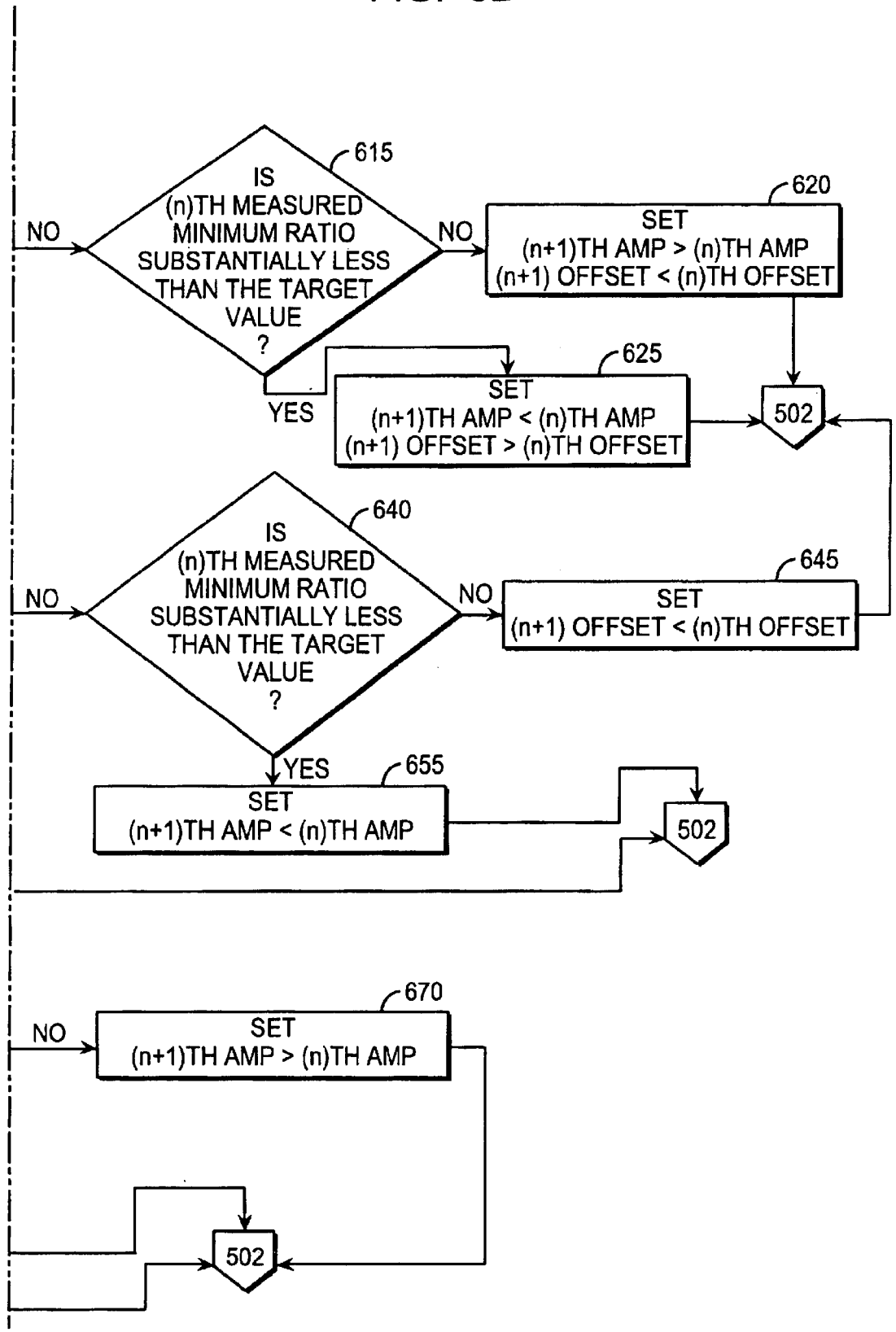
FIG. 6 is a flow chart summarizing certain additional steps in Applicants' method.

In certain embodiments, the target maximum servo signal ratio using Applicants' calibration method is about 0.9. In certain embodiments, the target minimum servo signal ratio is about 0.1. Thus, in certain embodiments Applicants' method calibrates a servo sensor by moving the tape head such that the sensor measures servo signal ratios between about 0.1 and about 0.9. Referring now to FIG. 6, in certain embodiments Applicants' method transitions from step 535 to step 605 wherein Applicants' method determines if the (n)th measured maximum servo signal ratio is substantially equal to the target maximum servo signal ratio. By substantially equal, Applicants' mean within about plus or minus about 0.03. Thus, if the target maximum servo signal ratio is set to 0.9, then measured ratios of about 0.87 to about 0.93 substantially equal that target value.

If Applicants' method determines in step 605 that the (n)th measured maximum servo signal ratio is substantially equal to the target maximum servo signal ratio, then Applicants' method transitions from step 605 to step 610 wherein Applicants' method determines if the (n)th measured minimum servo signal ratio substantially equals the target minimum servo signal ratio. If Applicants' method determines in step 610 that the (n)th measured minimum servo signal ratio substantially equals the target minimum servo signal ratio, then Applicants' method transitions from step 610 to either step 540 (FIG. 5B) or to step 550 (FIG. 5B).

Alternatively, if Applicants' method determines in step 610 that the (n)th measured minimum servo signal ratio does not substantially equal the target minimum servo signal ratio, then Applicants' method transitions from step 610 to step 615 wherein Applicants' method determines if the (n)th measured minimum servo signal ratio is substantially less than the target minimum servo signal ratio. If Applicants' method determines in step 615 that the (n)th measured minimum servo signal ratio is substantially less than the target minimum servo signal ratio, then Applicants' method transitions from step 615 to step 625 wherein Applicants' method sets the parameters for the (n+1)th positioning signal such that the (n+1)th positioning signal comprises the positioning signal frequency, the (n+1)th amplitude, and the (n+1)th DC offset, wherein the (n+1)th amplitude is less than the (n)th amplitude and wherein the (n+1)th DC offset is greater than the (n)th DC offset. Alternatively, If Applicants' method determines in step 615 that the (n)th measured minimum servo signal ratio is not substantially less than the target minimum servo signal ratio, then Applicants' method transitions from step 615 to step 620 wherein Applicants' method sets the parameters for the (n+1)th positioning signal such that the (n+1)th positioning signal comprises the positioning signal frequency, the (n+1)th amplitude, and the (n+1)th DC offset, wherein the (n+1)th amplitude is greater than the (n)th amplitude and wherein the (n+1)th DC offset is less than the (n)th DC offset.

If Applicants' method determines in step 605 that the (n)th measured maximum servo signal ratio does not substantially equal the target maximum servo signal ratio, then Applicants' method transitions from step 605 to step 630 wherein Applicants' method determines if the (n)th measured maximum servo signal ratio is substantially greater than the target maximum value. If Applicants' method determines in step 630 that the (n)th measured maximum servo signal ratio is substantially greater than the target maximum value, then Applicants' method transitions from step 630 to step 635 wherein Applicants' method determines if the (n)th measured minimum servo signal ratio substantially equals the target minimum servo signal ratio. If Applicants' method determines in step 635 that the (n)th measured minimum servo signal ratio substantially equals the target minimum servo signal ratio, then Applicants' method transitions from step 635 to step 650 wherein Applicants' method sets the parameters for the (n+1)th positioning signal such that the (n+1)th positioning signal comprises the positioning signal frequency, the (n+1)th amplitude, and the (n+1)th DC offset, wherein the (n+1)th amplitude is less than the (n)th amplitude and wherein the (n+1)th DC offset is less than the (n)th DC offset.

If Applicants' method determines in step 635 that the (n)th measured minimum servo signal ratio does not substantially equal the target minimum servo signal ratio, then Applicants' method transitions from step 635 to step 640 wherein Applicants' method determines if the (n)th measured minimum servo signal ratio is substantially less than the target minimum servo signal ratio. If Applicants' method determines in step 640 that the (n)th measured minimum servo signal ratio is substantially less than the target minimum servo signal ratio, then Applicants' method transitions from step 640 to step 655 wherein Applicants' method sets the parameters for the (n+1)th positioning signal such that the (n+1)th positioning signal comprises the positioning signal frequency, the (n+1)th amplitude, and the (n+1)th DC offset, wherein the (n+1)th amplitude is less than the (n)th amplitude and wherein the (n+1)th DC offset equals the (n)th DC offset. Alternatively, If Applicants' method determines in step 640 that the (n)th measured minimum servo signal ratio is not substantially less than the target minimum servo signal ratio, then Applicants' method transitions from step 640 to step 645 wherein Applicants' method sets the parameters for the (n+1)th positioning signal such that the (n+1)th positioning signal comprises the positioning signal frequency, the (n+1)th amplitude, and the (n+1)th DC offset, wherein the (n+1)th amplitude equals the (n)th amplitude and wherein the (n+1)th DC offset is less than the (n)th DC offset.

If Applicants' method determines in step 630 that the (n)th measured maximum servo signal ratio is not substantially greater than the target maximum servo signal ratio, then Applicants' method transitions from step 630 to step 660 wherein Applicants' method determines if the (n)th measured minimum servo signal ratio substantially equals the target minimum servo signal ratio. If Applicants' method determines in step 660 that the (n)th measured minimum servo signal ratio substantially equals the target minimum servo signal ratio, then Applicants' method transitions from step 660 to step 675 wherein Applicants' method sets the parameters for the (n+1)th positioning signal such that the (n+1)th positioning signal comprises the positioning signal frequency, the (n+1)th amplitude, and the (n+1)th DC offset, wherein the (n+1)th amplitude is greater than the (n)th amplitude and wherein the (n+1)th DC offset is greater than the (n)th DC offset.

If Applicants' method determines in step 660 that the (n)th measured minimum servo signal ratio does not substantially equal the target minimum servo signal ratio, then Applicants' method transitions from step 660 to step 665 wherein Applicants' method determines if the (n)th measured minimum servo signal ratio is substantially less than the target minimum servo signal ratio. If Applicants' method determines in step 665 that the (n)th measured minimum servo signal ratio is substantially less than the target minimum servo signal ratio, then Applicants' method transitions from step 665 to step 680 wherein Applicants' method sets the parameters for the (n+1)th positioning signal such that the (n+1)th positioning signal comprises the positioning signal frequency, the (n+1)th amplitude, and the (n+1)th DC offset, wherein the (n+1)th amplitude equals the (n)th amplitude and wherein the (n+1)th DC offset is greater than the (n)th DC offset. Alternatively, If Applicants' method determines in step 665 that the (n)th measured minimum servo signal ratio is not substantially less than the target minimum servo signal ratio, then Applicants' method transitions from step 665 to step 670 wherein Applicants' method sets the parameters for the (n+1)th positioning signal such that the (n+1)th positioning signal comprises the positioning signal frequency, the (n+1)th amplitude, and the (n+1)th DC offset, wherein the (n+1)th amplitude is greater than the (n)th amplitude and wherein the (n+1)th DC offset equals the (n)th DC offset.

Referring now to FIGS. 6 and 5A, Applicants' method transitions from steps 620, 625, 645, 650, 655, 670, 675, and 680, to step 502 wherein (n) is incremented. Applicants' method transitions from step 502 to step 505 wherein Applicants' method continues using an adjusted positioning signal which comprises the positioning signal frequency, an adjusted amplitude, and/or an adjusted DC offset.

Referring now to FIG. 5B, in certain embodiments Applicants' method transitions from step 535, or from step 610, to step 540 wherein the (n)th measured servo signal waveform is converted into a plurality of frequency components. In certain embodiments, step 540 is performed by servo logic, such as logic 160. In certain embodiments, step 540 includes using Fast Fourier transforms. Applicants' method transitions from step 540 to step 545 wherein Applicants' method selects from the frequency components of step 540 the frequency components at (N) harmonics of the positioning signal frequency, wherein (N) is equal to or greater than 1 and less than or equal to about 6. In certain embodiments, step 545 is performed by servo logic, such as logic 160. In these embodiments Applicants' method transitions from step 545 to step 555a wherein the selected frequency components of step 545 are used to form the (n)th filtered servo signal waveform. In certain embodiments, step 555a is performed by servo logic, such as logic 160. In certain of these embodiments, step 555 includes using Inverse Fast Fourier transforms. The embodiments of steps 540, 545 and 555a, are more fully described in the pending Application, assigned to the common assignee hereof, and having Ser. No. 10/035182, which is hereby incorporated herein by reference.

In certain embodiments, Applicants' method transitions from step 535, or from step 670, to step 550 wherein Applicants' method determines the real and imaginary components of the (n)th measured servo signal waveform at (N) harmonics of the positioning signal frequency, where (N) is an integer greater than or equal to 1 and less than or equal to about 6. In certain embodiments, step 550 is performed by servo logic, such as logic 160. In certain of these embodiments, step 550 includes using a Goertzel algorithm. In certain embodiments, Applicants' method uses a Goertzel algorithm defined by equation (1)

$$H f_i(z) = [1 - e^{(2\pi f_i/f_s)z-1}]/1 - 2\cos[2\pi f_i/f_s]z^{-1} + z^{-2} \quad (1)$$

where $f_i$ is the frequency of interest, and $f_s$ is the sampling frequency.

In certain of these embodiments, servo logic 160 (FIG. 1) further includes digital signal processor 165 (FIG. 1) comprising a Goertzel filter. In certain embodiments, Applicants' apparatus includes a second order recursive Goertzel filter I.

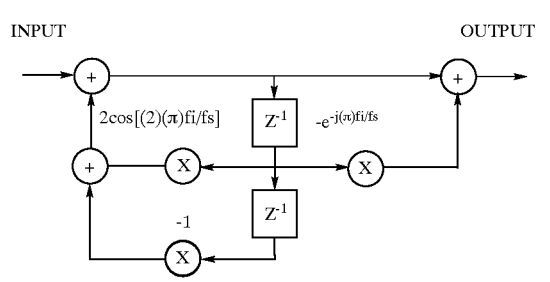

In these embodiments, Applicants' method transitions from step 550 to step 555b wherein Applicants' method forms the (n)th filtered servo signal waveform using the real and imaginary components of step 550. The embodiment of steps 550 and 555b is more fully described in the pending Application entitled "Method and Apparatus To Calibrate One or More Transducers In a Noisy Environment," assigned to the common assignee hereof, and filed on Jun. 27, 2002, Ser. No. 10/185125, which is hereby incorporated herein by reference.

As discussed above, independent position sensor ("IPS") 180 measures the position of tape head 190 with respect to the tape path 195. In step 560, Applicants' method samples the provided IPS signal at the predetermined sampling rate. In certain embodiments, step 560 is performed by servo logic, such as logic 160. Applicants' method transitions from step 560 to step 565 wherein Applicants' method forms the (n)th measured IPS signal waveform. In certain embodiments, step 565 is performed by servo logic, such as logic 160. The digitized measured IPS signal waveform of step 565 is dominated by the sinusoidal pattern having the positioning signal frequency, and not by the tape movement. The frequency of the positioning signal frequency is known precisely, and anything that is not at that positioning signal frequency, or its harmonics, comprises noise in the measurement.

In step 585, Applicants' method forms the (n)th filtered IPS signal waveform using the (n)th measured IPS waveform of step 565. In certain embodiments, step 585 is performed by servo logic, such as logic 160.

In certain embodiments, Applicants' method transitions from step 565 to step 570 wherein the (n)th measured IPS signal waveform is converted into a plurality of frequency components. In certain embodiments, step 570 is performed by servo logic, such as logic 160. In certain embodiments, step 570 includes using Fast Fourier transforms. Applicants' method transitions from step 570 to step 575 wherein Applicants' method selects from the frequency components of step 570 the frequency components at the positioning signal frequency and at (N) harmonics of that positioning signal frequency, wherein (N) is equal to or greater than 1 and less than or equal to about 6. In certain embodiments, step 575 is performed by servo logic, such as logic 160.

In these embodiments Applicants' method transitions from step 575 to step 585 wherein the selected frequency components of step 575 are used to form the (n)th filtered IPS signal waveform. In certain embodiments, step 585 is performed by servo logic, such as logic 160. In certain of these embodiments, step 585 includes using Inverse Fast Fourier transforms.

In certain embodiments, Applicants' method transitions from step 565 to step 580 wherein Applicants' method determines the real and imaginary components of the (n)th measured IPS signal waveform at (N) harmonics of the positioning signal frequency. In certain embodiments, step 580 is performed by servo logic, such as logic 160. In certain of these embodiments, step 580 includes using a Goertzel algorithm. In certain embodiments, such a Goertzel algorithm is implemented in a Goertzel filter.

In the Goertzel algorithm/filter embodiments, Applicants' method transitions from step 580 to step 585 wherein Applicants' method forms the (n)th filtered IPS signal waveform using the real and imaginary components of step 580. In certain embodiments, step 585 is performed by servo logic, such as logic 160.

Applicants' method transitions from step 585 to step 590 wherein Applicants' method forms an X/Y datapoint array comprising (M) actual datapoints determined by correlating the (n)th filtered servo signal waveform of step 555 with the (n)th filtered IPS waveform of step 585, where (M) is an integer greater than or equal to about 4 and less than or equal to about 16. In certain embodiments, (M) is 12. In certain embodiments, step 590 is performed by servo logic 160 (FIG. 1). This X/Y datapoint array comprises values for, inter alia, an actual maximum servo signal ratio and an actual minimum servo signal ratio.

In certain embodiments, Applicants' method includes comparing the (n)th X/Y datapoint array of step 590 with a pre-determined expected maximum servo signal ratio and a pre-determined expected minimum servo signal ratio. In certain embodiments, the expected maximum servo signal ratio and the expected minimum servo signal ratio are set in "firmware" disposed in servo logic, such as logic 160 (FIG. 1). In certain embodiments, the expected maximum servo signal ratio and the expected minimum servo signal ratio are set by the user during system initialization. In certain embodiments, the expected maximum servo signal ratio and the expected minimum servo signal ratio are set by field service personnel during system initialization. In certain embodiments, the expected maximum servo signal ratio and the expected minimum servo signal ratio are modified by Applicants' method in order to further refine the calibration of the servo sensors disposed in the system. In these embodiments, Applicants' method transitions from step 590 to step 705 (FIG. 7).

Figure 7B:
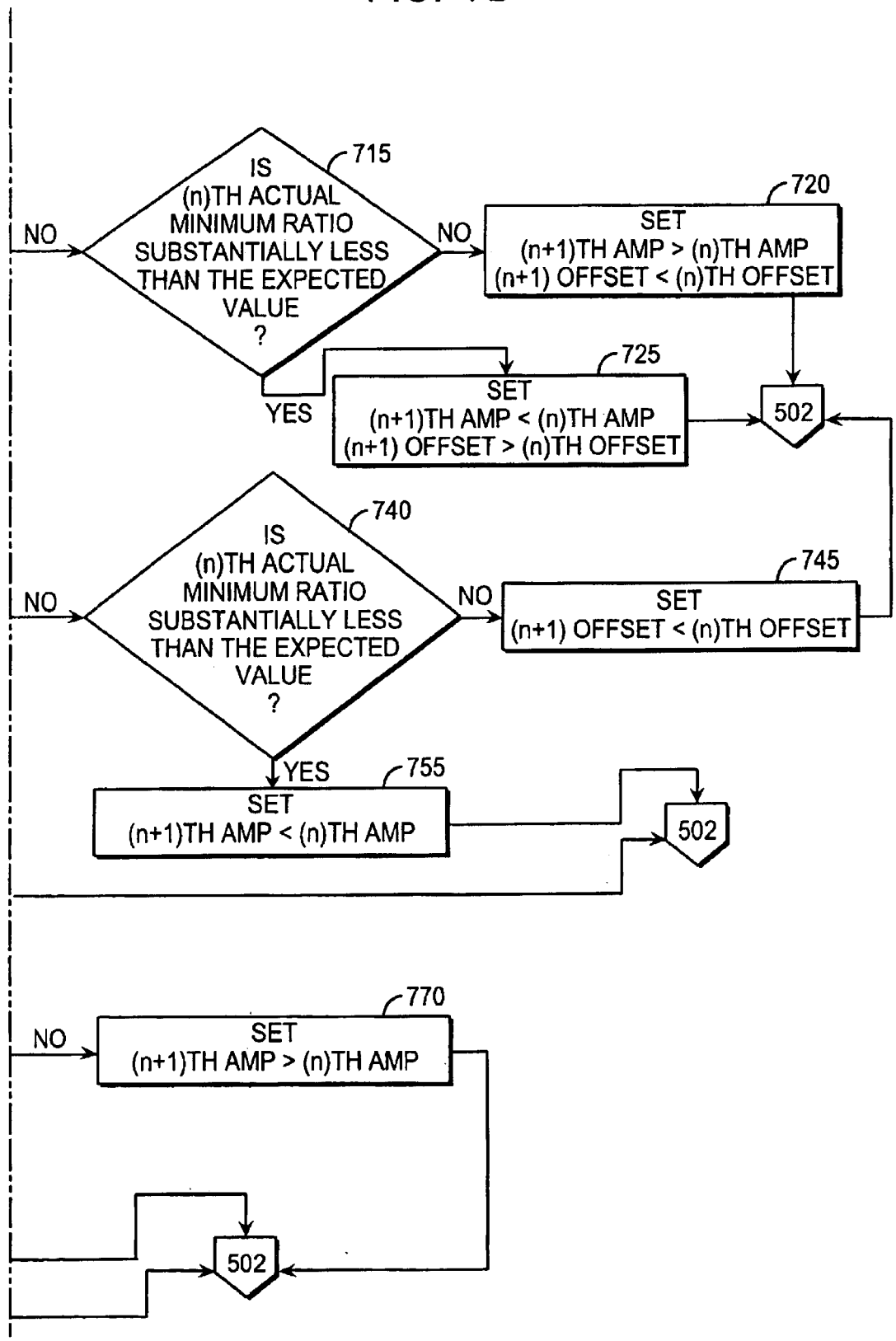
FIG. 7 is a flow chart summarizing certain additional steps in Applicants' method.

Referring now to FIG. 7, wherein Applicants' method determines if the (n)th actual maximum servo signal ratio is substantially equal to the expected maximum servo signal ratio. By substantially equal, Applicants' mean within about plus or minus about 0.03. Thus, if the expected maximum servo signal ratio is set to 0.9, then actual ratios of about 0.87 to about 0.93 substantially equal that expected value.

If Applicants' method determines in step 705 that the (n)th actual maximum servo signal ratio is substantially equal to the expected maximum servo signal ratio, then Applicants' method transitions from step 705 to step 710 wherein Applicants' method determines if the (n)th actual minimum servo signal ratio substantially equals the expected minimum servo signal ratio. If Applicants' method determines in step 710 that the (n)th actual minimum servo signal ratio substantially equals the expected minimum servo signal ratio, then Applicants' method transitions from step 710 to step 595 (FIG. 5B).

Alternatively, if Applicants' method determines in step 710 that the (n)th actual minimum servo signal ratio does not substantially equal the expected minimum servo signal ratio, then Applicants' method transitions from step 710 to step 715 wherein Applicants' method determines if the (n)th actual minimum servo signal ratio is substantially less than the expected minimum servo signal ratio. If Applicants' method determines in step 715 that the (n)th actual minimum servo signal ratio is substantially less than the expected minimum servo signal ratio, then Applicants' method transitions from step 715 to step 725 wherein Applicants' method sets the parameters for the (n+1)th positioning signal such that the (n+1)th positioning signal comprises the positioning signal frequency, the (n+1)th amplitude, and the (n+1)th DC offset, wherein the (n+1)th amplitude is less than the (n)th amplitude and wherein.

Applicants' method sets the parameters for the (n+1)th positioning signal such that the (n+1)th positioning signal comprises the positioning signal frequency, the (n+1)th amplitude, and the (n+1)th DC offset, wherein the (n+1)th amplitude is less than the (n)th amplitude and wherein the (n+1)th DC offset is greater than the (n)th DC offset. Alternatively, If Applicants' method determines in step 715 that the (n)th actual minimum servo signal ratio is not substantially less than the expected minimum servo signal ratio, then Applicants' method transitions from step 715 to step 720 wherein Applicants' method sets the parameters for the (n+1)th positioning signal such that the (n+1)th positioning signal comprises the positioning signal frequency, the (n+1)th amplitude, and the (n+1)th DC offset, wherein the (n+1)th amplitude is greater than the (n)th amplitude and wherein the (n+1)th DC offset is less than the (n)th DC offset.

If Applicants' method determines in step 705 that the (n)th actual maximum servo signal ratio does not substantially equal the expected maximum servo signal ratio, then Applicants' method transitions from step 705 to step 730 wherein Applicants' method determines if the (n)th actual maximum servo signal ratio is substantially greater than the expected maximum value. If Applicants' method determines in step 730 that the (n)th actual maximum servo signal ratio is substantially greater than the expected maximum value, then Applicants' method transitions from step 730 to step 735 wherein Applicants' method determines if the (n)th actual minimum servo signal ratio substantially equals the expected minimum servo signal ratio. If Applicants' method determines in step 735 that the (n)th actual minimum servo signal ratio substantially equals the expected minimum servo signal ratio, then Applicants' method transitions from step 735 to step 750 wherein Applicants' method sets the parameters for the (n+1)th positioning signal such that the (n+1)th positioning signal comprises the positioning signal frequency, the (n+1)th amplitude, and the (n+1)th DC offset, wherein the (n+1)th amplitude is less than the (n)th amplitude and wherein the (n+1)th DC offset is less than the (n)th DC offset.

If Applicants' method determines in step 735 that the (n)th actual minimum servo signal ratio does not substantially equal the expected minimum servo signal ratio, then Applicants' method transitions from step 735 to step 740 wherein Applicants' method determines if the (n)th actual minimum servo signal ratio is substantially less than the expected minimum servo signal ratio. If Applicants' method determines in step 740 that the (n)th actual minimum servo signal ratio is substantially less than the expected minimum servo signal ratio, then Applicants' method transitions from step 740 to step 755 wherein Applicants' method sets the parameters for the (n+1)th positioning signal such that the (n+1)th positioning signal comprises the positioning signal frequency, the (n+1)th amplitude, and the (n+1)th DC offset, wherein the (n+1)th amplitude is less than the (n)th amplitude and wherein the (n+1)th DC offset equals the (n)th DC offset. Alternatively, If Applicants' method determines in step 740 that the (n)th actual minimum servo signal ratio is not substantially less than the expected minimum servo signal ratio, then Applicants' method transitions from step 740 to step 745 wherein Applicants' method sets the parameters for the (n+1)th positioning signal such that the (n+1)th positioning signal comprises the positioning signal frequency, the (n+1)th amplitude, and the (n+1)th DC offset, wherein the (n+1)th amplitude equals the (n)th amplitude and wherein the (n+1)th DC offset is less than the (n)th DC offset.

If Applicants' method determines in step 730 that the (n)th actual maximum servo signal ratio is not substantially greater than the expected maximum servo signal ratio, then Applicants' method transitions from step 730 to step 760 wherein Applicants' method determines if the (n)th actual minimum servo signal ratio substantially equals the expected minimum servo signal ratio. If Applicants' method determines in step 760 that the (n)th actual minimum servo signal ratio substantially equals the expected minimum servo signal ratio, then Applicants' method transitions from step 760 to step 775 wherein Applicants' method sets the parameters for the (n+1)th positioning signal such that the (n+1)th positioning signal comprises the positioning signal frequency, the (n+1)th amplitude, and the (n+1)th DC offset, wherein the (n+1)th amplitude is greater than the (n)th amplitude and wherein the (n+1)th DC offset is greater than the (n)th DC offset.

If Applicants' method determines in step 760 that the (n)th actual minimum servo signal ratio does not substantially equal the expected minimum servo signal ratio, then Applicants' method transitions from step 760 to step 765 wherein Applicants' method determines if the (n)th actual minimum servo signal ratio is substantially less than the expected minimum servo signal ratio. If Applicants' method determines in step 765 that the (n)th actual minimum servo signal ratio is substantially less than the expected minimum servo signal ratio, then Applicants' method transitions from step 765 to step 780 wherein Applicants' method sets the parameters for the (n+1)th positioning signal such that the (n+1)th positioning signal comprises the positioning signal frequency, the (n+t)th amplitude, and the (n+1)th DC offset, wherein the (n+1)th amplitude equals the (n)th amplitude and wherein the (n+1)th DC offset is greater than the (n)th DC offset. Alternatively, If Applicants' method determines in step 765 that the (n)th measured minimum servo signal ratio is not substantially less than the expected minimum servo signal ratio, then Applicants' method transitions from step 765 to step 770 wherein Applicants' method sets the parameters for the (n+1)th positioning signal such that the (n+1)th positioning signal comprises the positioning signal frequency, the (n+1)th amplitude, and the (n+1)th DC offset, wherein the (n+1)th amplitude is greater than the (n)th amplitude and wherein the (n+1)th DC offset equals the (n)th DC offset.

Referring now to FIGS. 7 and 5A, Applicants' method transitions from steps 720, 725, 745, 750, 755, 770, 775, and 780, to step 502 wherein (n) is incremented. Applicants' method transitions from step 502 to step 505 wherein Applicants' method continues using an adjusted positioning signal which comprises the positioning signal frequency, an adjusted amplitude, and/or an adjusted DC offset.

As discussed above, in certain embodiments Applicants' method transitions from step 590 (FIG. 5B) to step 595 (FIG. 5B). In other embodiments, Applicants' method transitions from step 710 (FIG. 7) to step 595 (FIG. 5B). In step 595, Applicants' method forms the (n)th transfer function using the (n)th X/Y datapoint array of step 590 and using an (m)th order regression analysis, where (m) is greater than 1 and less than or equal to about 6. In certain embodiments, a second order curve fitting algorithm is used. In certain embodiments, a third order curve fitting algorithm is used. In certain embodiments, one or more higher order curve fitting algorithms are used wherein (m) is 4, 5, or 6.

Applicants' method transitions from step 595 to step 599 wherein the (n)th transfer function formed in step 595 is saved for subsequent use. As those skilled in the art will appreciate, the transfer function of step 595 is subsequently used to determine the position error signal ("PES") for the servo loop at the laterally offset servo index positions with respect to the sensed first set of linear servo edges. Such PES signals comprise calculated servo signal ratios for predetermined positions on either side of each servo edge. As discussed above, ratios which are at outer positions, for example, ratios of "0" and of "1" cannot be accurately sensed and determined. Rather, the PES signal formed using the transfer function of step 595 can be subsequently extrapolated to include the outer positions, i.e. ratios of "0" and "1".

In certain embodiments, one or more individual steps of Applicants' method summarized in FIGS. 5A, 5B, 6, and 7, may be combined, eliminated, or reordered. In certain embodiments, Applicants' method comprises the steps of FIGS. 5A and 5B. In certain embodiments, Applicants' method includes the steps of FIGS. 5A, 5B, and 6. In certain embodiments, Applicants' method includes the steps of FIGS. 5A, 5B, and 7.

Applicants' invention further includes an article of manufacture comprising a computer useable medium having computer readable program code disposed therein to calibrate a servo sensor. Applicants' invention further includes a computer program product usable with a programmable computer processor having computer readable program code embodied therein to calibrate a servo sensor.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to calibrate a servo sensor disposed on a magnetic tape head disposed adjacent a magnetic tape moving along a tape path, wherein said magnetic tape includes at least one servo edge comprising an interface between a first recorded signal and a second recorded signal, wherein said servo sensor detects said first recorded signal and said second recorded signal, and wherein an independent position sensor provides an IPS signal comprising the lateral position of said tape head with respect to the tape path, wherein (n) is initially set to 1, said method comprising the steps of:

providing the (n)th positioning signal, wherein said (n)th positioning signal comprises a positioning signal frequency, the (n)th amplitude, and the (n)th DC offset;

moving said tape head alternatingly in a first direction and an opposing second direction along a first axis as said tape moves along a second axis, wherein said first axis and said second axis are substantially orthogonal, wherein the position of said magnetic head along said first axis as a function of time is determined by said (n)th positioning signal;

providing a servo signal, wherein said servo signal comprises the ratio of the detected first recorded signal and the detected second recorded signal;

forming the (n)th measured servo signal waveform, wherein said (n)th measured servo signal waveform comprises a measured maximum servo signal ratio and a measured minimum servo signal ratio;

establishing a target maximum servo signal ratio for said (n)th measured servo signal waveform;

establishing a target minimum servo signal ratio for said (n)th measured servo signal waveform;

determining if said measured maximum servo signal ratio substantially equals said target maximum servo signal ratio;

operative if said measured maximum servo signal ratio substantially equals said target maximum servo signal ratio, determining if said measured minimum servo signal ratio substantially equals said target minimum servo signal ratio;

operative if said measured minimum servo signal ratio substantially equals said target minimum servo signal ratio, forming the (n)th filtered servo signal waveform using said (n)th measured servo signal waveform;

providing an IPS signal;

forming the (n)th measured IPS signal waveform;

forming the (n)th filtered IPS signal waveform;

forming the (n)th X/Y datapoint array;

calculating the (n)th transfer function; and saving said (n)th transfer function.

2. The method of claim 1, wherein said measured maximum servo signal ratio does not substantially equal said target maximum servo signal ratio, further comprising the steps of:

establishing the (n+1)th positioning signal, wherein said (n+1)th positioning signal comprises said positioning signal frequency, the (n+1)th amplitude, and the (n+1)th DC offset;

moving said tape head alternatingly in a first direction and an opposing second direction along a first axis as said tape moves along a second axis, wherein said first axis and said second axis are substantially orthogonal, wherein the position of said magnetic head along said first axis as a function of time is determined by said (n+1)th positioning signal;

providing the (n+1)th servo signal, wherein said (n+1)th servo signal comprises the ratio of the detected first recorded signal and the detected second recorded signal;

forming the (n+1)th measured servo signal waveform;

forming the (n+1)th filtered servo signal waveform using said (n+1)th measured servo signal waveform;

forming the (n+1)th measured IPS signal waveform;

forming the (n+1)th filtered IPS signal waveform;

forming the (n+1)th X/Y datapoint array;

calculating the (n+1)th transfer function; and saving said (n+1)th transfer function.

3. The method of claim 2, further comprising the step of determining said (n+1)th amplitude, wherein said (n+1)th amplitude is less than said (n)th amplitude.

4. The method of claim 3, further comprising the step of determining said (n+1) DC offset, wherein said (n+1)th DC offset is less than said (n)th DC offset.

5. The method of claim 3, further comprising the step of determining said (n+1) DC offset, wherein said (n+1)th DC offset is greater than said (n)th DC offset.

6. The method of claim 2, further comprising the step of determining said (n+1)th amplitude, wherein said (n+1)th amplitude is greater than said (n)th amplitude.

7. The method of claim 6, further comprising the step of determining said (n+1) DC offset, wherein said (n+1)th DC offset is less than said (n)th DC offset.

8. The method of claim 6, further comprising the step of determining said (n+1) DC offset, wherein said (n+1)th DC offset is greater than said (n)th DC offset.

9. The method of claim 1, wherein said X/Y datapoint array comprises an actual maximum servo signal ratio and an actual minimum servo signal ratio, further comprising the steps of:

establishing an expected maximum servo signal ratio for said X/Y datapoint array;

establishing an expected minimum servo signal ratio for said X/Y datapoint array;

determining if said actual maximum servo signal substantially equals said expected maximum servo signal ratio;

operative if said actual maximum servo signal substantially equals said expected maximum servo signal ratio, determining if said actual minimum servo signal ratio substantially equals said expected minimum servo signal ratio; and operative if said actual minimum servo signal ratio substantially equals said expected minimum servo signal ratio, forming said (n)th transfer function using said X/Y datapoint array.

10. The method of claim 9, wherein said wherein said actual maximum servo signal ratio does not substantially equal said expected maximum servo signal ratio, further comprising the steps of:

establishing the (n+1)th positioning signal, wherein said (n+1)th positioning signal comprises said positioning signal frequency, the (n+1)th amplitude, and the (n+1)th DC offset;

moving said tape head alternatingly in a first direction and an opposing second direction along a first axis as said tape moves along a second axis, wherein said first axis and said second axis are substantially orthogonal, wherein the position of said magnetic head along said first axis as a function of time is determined by said (n+1)th positioning signal;

providing the (n+1)th servo signal, wherein said (n+1)th servo signal comprises the ratio of the detected first recorded signal and the detected second recorded signal;

forming the (n+1)th measured servo signal waveform;

forming the (n+1)th filtered servo signal waveform using said (n+1)th measured servo signal waveform;

forming the (n+1)th measured IPS signal waveform;

forming the (n+1)th filtered IPS signal waveform;

forming the (n+1)th X/Y datapoint array;

calculating the (n+1)th transfer function; and saving said (n+1)th transfer function.

11. The method of claim 10, further comprising the step of determining said (n+1)th amplitude, wherein said (n+1)th amplitude is less than said (n)th amplitude.

12. The method of claim 11, further comprising the step of determining said (n+1) DC offset, wherein said (n+1)th DC offset is less than said (n)th DC offset.

13. The method of claim 11, further comprising the step of determining said (n+1) DC offset, wherein said (n+1)th DC offset is greater than said (n)th DC offset.

14. The method of claim 10, further comprising the step of determining said (n+1)th amplitude, wherein said (n+1)th amplitude is greater than said (n)th amplitude.

15. The method of claim 14, further comprising the step of determining said (n+1) DC offset, wherein said (n+1)th DC offset is less than said (n)th DC offset.

16. The method of claim 14, further comprising the step of determining said (n+1) DC offset, wherein said (n+1)th DC offset is greater than said (n)th DC offset.

17. A method to calibrate a servo sensor disposed on a magnetic tape head disposed adjacent a magnetic tape moving along a tape path, wherein said magnetic tape includes at least one servo edge comprising an interface between a first recorded signal and a second recorded signal, wherein said servo sensor detects said first recorded signal and said second recorded signal, and wherein an independent position sensor provides an IPS signal comprising the lateral position of said tape head with respect to the tape path, wherein (n) is initially set to 1, said method comprising the steps of:

providing a positioning signal, wherein said positioning signal comprises a positioning signal frequency, the (n)th amplitude, and the (n)th DC offset;

moving said tape head alternatingly in a first direction and an opposing second direction along a first axis as said tape moves along a second axis, wherein said first axis and said second axis are substantially orthogonal, wherein the position of said magnetic head along said first axis as a function of time is determined by said (n)th positioning signal;

providing the (n)th servo signal, wherein said (n)th servo signal comprises the ratio of the detected first recorded signal and the detected second recorded signal;

providing a sampling rate;

sampling said servo signal at said sampling rate;

forming the (n)th measured servo signal waveform;

establishing a target maximum servo signal ratio for said (n)th measured servo signal waveform;

establishing a target minimum servo signal ratio for said (n)th measured servo signal waveform;

determining if said measured maximum servo signal ratio substantially equals said target maximum servo signal ratio;

operative if said measured maximum servo signal ratio substantially equals said target maximum servo signal ratio, determining if said measured minimum servo signal ratio substantially equals said target minimum servo signal ratio;

operative if said measured minimum servo signal ratio substantially equals said target minimum servo signal ratio:

computing using a Goertzel filter at (N) harmonics of said positioning signal frequency, the real components and the imaginary components of said (n)th measured servo signal waveform, wherein (N) is greater than or equal to 1 and less than or equal to about 6; and forming the (n)th filtered servo signal waveform using said real components and said imaginary components of said (n)th measured servo signal waveform;

providing an IPS signal;

sampling said IPS signal at said sampling rate forming the (n)th measured IPS signal waveform;

computing using a Goertzel filter at (N) harmonics of said positioning signal frequency, the real components and the imaginary components of said (n)th measured IPS signal waveform;

forming the (n)th filtered IPS signal waveform using said real components and said imaginary components of said (n)th measured IPS signal waveform;

forming the (n)th X/Y datapoint array, wherein said X/Y datapoint array comprises an actual maximum servo signal ratio and an actual minimum servo signal ratio;

establishing an expected maximum servo signal ratio for said X/Y datapoint array;

establishing an target minimum servo signal ratio for said X/Y datapoint array;

determining if said actual maximum servo signal ratio substantially equals said expected maximum servo signal ratio;

operative if said actual maximum servo signal ratio substantially equals said expected maximum servo signal ratio, determining if said actual minimum servo signal ratio substantially equals said expected minimum servo signal ratio;

operative if said actual minimum servo signal ratio substantially equals said expected minimum servo signal ratio:

calculating the (n)th transfer function;

saving said (n)th transfer function.

18. An article of manufacture comprising a computer useable medium having computer readable program code disposed therein to calibrate a servo sensor disposed on a magnetic tape head disposed adjacent a magnetic tape moving along a tape path, wherein said magnetic tape includes at least one servo edge comprising an interface between a first recorded signal and a second recorded signal, wherein said servo sensor detects said first recorded signal and said second recorded signal, and wherein an independent position sensor provides an IPS signal comprising the lateral position of said tape head with respect to the tape path, wherein (n) is initially set to 1, the computer readable program code comprising a series of computer readable program steps to effect:

receiving the (n)th positioning signal, wherein said (n)th positioning signal comprises a positioning signal frequency, the (n)th amplitude, and the (n)th DC offset;

moving said tape head alternatingly in a first direction and an opposing second direction along a first axis as said tape moves along a second axis, wherein said first axis and said second axis are substantially orthogonal, wherein the position of said magnetic head along said first axis as a function of time is determined by said (n)th positioning signal;

receiving a servo signal, wherein said servo signal comprises the ratio of the detected first recorded signal and the detected second recorded signal;

forming the (n)th measured servo signal waveform, wherein said (n)th measured servo signal waveform comprises a measured maximum servo signal ratio and a measured minimum servo signal ratio;

establishing a target maximum servo signal ratio for said (n)th measured servo signal waveform;

establishing a target minimum servo signal ratio for said (n)th measured servo signal waveform;

determining if said measured maximum servo signal ratio substantially equals said target maximum servo signal ratio;

operative if said measured maximum servo signal ratio substantially equals said target maximum servo signal ratio, determining if said measured minimum servo signal ratio substantially equals said target minimum servo signal ratio;

operative if said measured minimum servo signal ratio substantially equals said target minimum servo signal ratio, forming the (n)th filtered servo signal waveform using said (n)th measured servo signal waveform;

receiving an IPS signal;

forming the (n)th measured IPS signal waveform;

forming the (n)th filtered IPS signal waveform;

forming the (n)th X/Y datapoint array;

calculating the (n)th transfer function; and saving said (n)th transfer function.

19. The article of manufacture of claim 18, wherein said measured maximum servo signal ratio does not substantially equal said target maximum servo signal ratio, wherein said computer readable program code further comprises a series of computer readable program steps to effect:

establishing the (n+1)th positioning signal, wherein said (n+1)th positioning signal comprises said positioning signal frequency, the (n+1)th amplitude, and the (n+1)th DC offset;

moving said tape head alternatingly in a first direction and an opposing second direction along a first axis as said tape moves along a second axis, wherein said first axis and said second axis are substantially orthogonal, wherein the position of said magnetic head along said first axis as a function of time is determined by said (n+1)th positioning signal;

providing the (n+1)th servo signal, wherein said (n+1)th servo signal comprises the ratio of the detected first recorded signal and the detected second recorded signal;

forming the (n+1)th measured servo signal waveform;

forming the (n+1)th filtered servo signal waveform using said (n+1)th measured servo signal waveform;

forming the (n+1)th measured IPS signal waveform;

forming the (n+1)th filtered IPS signal waveform;

forming the (n+1)th X/Y datapoint array;

calculating the (n+1)th transfer function; and saving said (n+1)th transfer function.

20. The article of manufacture of claim 19, wherein said computer readable program code further comprises a series of computer readable program steps to effect determining said (n+1)th amplitude, wherein said (n+1)th amplitude is less than said (n)th amplitude.

21. The article of manufacture of claim 20, wherein said computer readable program code further comprises a series of computer readable program steps to effect determining said (n+1) DC offset, wherein said (n+1)th DC offset is less than said (n)th DC offset.

22. The article of manufacture of claim 20, wherein said computer readable program code further comprises a series of computer readable program steps to effect determining said (n+1) DC offset, wherein said (n+1)th DC offset is greater than said (n)th DC offset.

23. The article of manufacture of claim 19, wherein said computer readable program code further comprises a series of computer readable program steps to effect determining said (n+1)th amplitude, wherein said (n+1)th amplitude is greater than said (n)th amplitude.

24. The article of manufacture of claim 23, wherein said computer readable program code further comprises a series of computer readable program steps to effect determining said (n+1) DC offset, wherein said (n+1)th DC offset is less than said (n)th DC offset.

25. The article of manufacture of claim 23, wherein said computer readable program code further comprises a series of computer readable program steps to effect determining said (n+1) DC offset, wherein said (n+1)th DC offset is greater than said (n)th DC offset.

26. The article of manufacture of claim 18, wherein said X/Y datapoint array comprises an actual maximum servo signal ratio and an actual minimum servo signal ratio, wherein said computer readable program code further comprises a series of computer readable program steps to effect:

establishing an expected maximum servo signal ratio for said X/Y datapoint array;

establishing an expected minimum servo signal ratio for said X/Y datapoint array;

determining if said actual maximum servo signal substantially equals said expected maximum servo signal ratio;

operative if said actual maximum servo signal substantially equals said expected maximum servo signal ratio, determining if said actual minimum servo signal ratio substantially equals said expected minimum servo signal ratio; and operative if said actual minimum servo signal ratio substantially equals said expected minimum servo signal ratio, forming said (n)th transfer function using said X/Y datapoint array.

27. The article of manufacture of claim 26, wherein said wherein said actual maximum servo signal ratio does not substantially equal said expected maximum servo signal ratio, wherein said computer readable program code further comprises a series of computer readable program steps to effect:

establishing the (n+1)th positioning signal, wherein said (n+1)th positioning signal comprises said positioning signal frequency, the (n+1)th amplitude, and the (n+1)th DC offset;

moving said tape head alternatingly in a first direction and an opposing second direction along a first axis as said tape moves along a second axis, wherein said first axis and said second axis are substantially orthogonal, wherein the position of said magnetic head along said first axis as a function of time is determined by said (n+1)th positioning signal;

providing the (n+1)th servo signal, wherein said (n+1)th servo signal comprises the ratio of the detected first recorded signal and the detected second recorded signal;

forming the (n+1)th measured servo signal waveform;

forming the (n+1)th filtered servo signal waveform using said (n+1)th measured servo signal waveform;

forming the (n+1)th measured IPS signal waveform;

forming the (n+1)th filtered IPS signal waveform;

forming the (n+1)th X/Y datapoint array;

calculating the (n+1)th transfer function; and saving said (n+1)th transfer function.

28. The article of manufacture of claim 27, wherein said computer readable program code further comprises a series of computer readable program steps to effect determining said (n+1)th amplitude, wherein said (n+1)th amplitude is less than said (n)th amplitude.

29. The article of manufacture of claim 28, wherein said computer readable program code further comprises a series of computer readable program steps to effect determining said (n+1) DC offset, wherein said (n+1)th DC offset is less than said (n)th DC offset.

30. The article of manufacture of claim 28, wherein said computer readable program code farther comprises a series of computer readable program steps to effect determining said (n+1) DC offset, wherein said (n+1)th DC offset is greater than said (n)th DC offset.

31. The article of manufacture of claim 27, wherein said computer readable program code further comprises a series of computer readable program steps to effect determining said (n+1)th amplitude, wherein said (n+1)th amplitude is greater than said (n)th amplitude.

32. The article of manufacture of claim 31, wherein said computer readable program code further comprises a series of computer readable program steps to effect determining said (n+1) DC offset, wherein said (n+1)th DC offset is less than said (n)th DC offset.

33. The article of manufacture of claim 31, wherein said computer readable program code further comprises a series of computer readable program steps to effect determining said (n+1) DC offset, wherein said (n+1)th DC offset is greater than said (n)th DC offset.

34. An article of manufacture comprising a computer useable medium having computer readable program code disposed therein to calibrate a servo sensor disposed on a magnetic tape head disposed adjacent a magnetic tape moving along a tape path, wherein said magnetic tape includes at least one servo edge comprising an interface between a first recorded signal and a second recorded signal, wherein said servo sensor detects said first recorded signal and said second recorded signal, and wherein an independent position sensor provides an IPS signal comprising the lateral position of said tape head with respect to the tape path, the computer readable program code comprising a series of computer readable program steps to effect:

providing a positioning signal, wherein said positioning signal comprises a positioning signal frequency, the (n)th amplitude, and the (n)th DC offset;

moving said tape head alternatingly in a first direction and an opposing second direction along a first axis as said tape moves along a second axis, wherein said first axis and said second axis are substantially orthogonal, wherein the position of said magnetic head along said first axis as a function of time is determined by said (n)th positioning signal;

providing the (n)th servo signal, wherein said (n)th servo signal comprises the ratio of the detected first recorded signal and the detected second recorded signal;

providing a sampling rate;

sampling said servo signal at said sampling rate;

forming the (n)th measured servo signal waveform;

establishing a target maximum servo signal ratio for said (n)th measured servo signal waveform;

establishing a target minimum servo signal ratio for said (n)th measured servo signal waveform;

determining if said measured maximum servo signal ratio substantially equals said target maximum servo signal ratio;

operative if said measured maximum servo signal ratio substantially equals said target maximum servo signal ratio, determining if said measured minimum servo signal ratio substantially equals said target minimum servo signal ratio;

operative if said measured minimum servo signal ratio substantially equals said target minimum servo signal ratio:

computing using a Goertzel filter at (N) harmonics of said positioning signal frequency, the real components and the imaginary components of said (n)th measured servo signal waveform, wherein (N) is greater than or equal to 1 and less than or equal to about 6; and forming the (n)th filtered servo signal waveform using said real components and said imaginary components of said (n)th measured servo signal waveform;

providing an IPS signal;

sampling said IPS signal at said sampling rate;

forming the (n)th measured IPS signal waveform;

computing using a Goertzel filter at (N) harmonics of said positioning signal frequency, the real components and the imaginary components of said (n)th measured IPS signal waveform;

forming the (n)th filtered IPS signal waveform using said real components and said imaginary components of said (n)th measured IPS signal waveform;

forming the (n)th X/Y datapoint array, wherein said X/Y datapoint array comprises an actual maximum servo signal ratio and an actual minimum servo signal ratio;

establishing an expected maximum servo signal ratio for said X/Y datapoint array;

establishing an target minimum servo signal ratio for said X/Y datapoint array;

determining if said actual maximum servo signal ratio substantially equals said expected maximum servo signal ratio;

operative if said actual maximum servo signal ratio substantially equals said expected maximum servo signal ratio, determining if said actual minimum servo signal ratio substantially equals said expected minimum servo signal ratio;

operative if said actual minimum servo signal ratio substantially equals said expected minimum servo signal ratio;

calculating the (n)th transfer function;

saving said (n)th transfer function.

35. A computer program product usable with a programmable computer processor having computer readable program code embodied therein to calibrate a servo sensor disposed on a magnetic tape head disposed adjacent a magnetic tape moving along a tape path, wherein said magnetic tape includes at least one servo edge comprising an interface between a first recorded signal and a second recorded signal, wherein said servo sensor detects said first recorded signal and said second recorded signal, and wherein an independent position sensor provides an IPS signal comprising the lateral position of said tape head with respect to the tape path, wherein (n) is initially set to 1, comprising:

computer readable program code which causes said programmable computer processor to provide the (n)th positioning signal, wherein said (n)th positioning signal comprises a positioning signal frequency, the (n)th amplitude, and the (n)th DC offset;

computer readable program code which causes said programmable computer processor to move said tape head alternatingly in a first direction and an opposing second direction along a first axis as said tape moves along a second axis, wherein said first axis and said second axis are substantially orthogonal, wherein the position of said magnetic head along said first axis as a function of time is determined by said (n)th positioning signal;

computer readable program code which causes said programmable computer processor to receive a servo signal, wherein said servo signal comprises the ratio of the detected first recorded signal and the detected second recorded signal;

computer readable program code which causes said programmable computer processor to form the (n)th measured servo signal waveform, wherein said (n)th measured servo signal waveform comprises a measured maximum servo signal ratio and a measured minimum servo signal ratio;

computer readable program code which causes said programmable computer processor to receive a target maximum servo signal ratio for said (n)th measured servo signal waveform;

computer readable program code which causes said programmable computer processor to receive a target minimum servo signal ratio for said (n)th measured servo signal waveform;

computer readable program code which causes said programmable computer processor to determine if said measured maximum servo signal ratio substantially equals said target maximum servo signal ratio;

computer readable program code which, if said measured maximum servo signal ratio substantially equals said target maximum servo signal ratio, causes said programmable computer processor to determine if said measured minimum servo signal ratio substantially equals said target minimum servo signal ratio;

computer readable program code which, if said measured minimum servo signal ratio substantially equals said target minimum servo signal ratio, causes said programmable computer processor to form the (n)th filtered servo signal waveform using said (n)th measured servo signal waveform;

computer readable program code which causes said programmable computer processor to receive an IPS signal;

computer readable program code which causes said programmable computer processor to form the (n)th measured IPS signal waveform;

computer readable program code which causes said programmable computer processor to form the (n)th filtered IPS signal waveform;

computer readable program code which causes said programmable computer processor to form the (n)th X/Y datapoint array;

computer readable program code which causes said programmable computer processor to calculate the (n)th transfer function; and computer readable program code which causes said programmable computer processor to save said (n)th transfer function.

36. The computer program product of claim 35, wherein said measured maximum servo signal ratio does not substantially equal said target maximum servo signal ratio, further comprising:

computer readable program code which causes said programmable computer processor to set the (n+1)th positioning signal, wherein said (n+1)th positioning signal comprises said positioning signal frequency, the (n+1)th amplitude, and the (n+1)th DC offset;

computer readable program code which causes said programmable computer processor to move said tape head alternatingly in a first direction and an opposing second direction along a first axis as said tape moves along a second axis, wherein said first axis and said second axis are substantially orthogonal, wherein the position of said magnetic head along said first axis as a function of time is determined by said (n+1)th positioning signal;

computer readable program code which causes said programmable computer processor to form the (n+1)th measured servo signal waveform;

computer readable program code which causes said programmable computer processor to form the (n+1)th filtered servo signal waveform using said (n+1)th measured servo signal waveform;

computer readable program code which causes said programmable computer processor to form the (n+1)th measured IPS signal waveform;

computer readable program code which causes said programmable computer processor to form the (n+1)th filtered IPS signal waveform;

computer readable program code which causes said programmable computer processor to form the (n+1)th X/Y datapoint array;

computer readable program code which causes said programmable computer processor to calculate the (n+1)th transfer function; and computer readable program code which causes said programmable computer processor to save said (n+1)th transfer function.

37. The computer program product of claim 36, further comprising computer readable program code which causes said programmable computer processor to set said (n+1)th amplitude, wherein said (n+1)th amplitude is less than said (n)th amplitude.

38. The computer program product of claim 37, further comprising computer readable program code which causes said programmable computer processor to set said (n+1) DC offset, wherein said (n+1)th DC offset is less than said (n)th DC offset.

39. The computer program product of claim 37, further comprising computer readable program code which causes said programmable computer processor to set said (n+1) DC offset, wherein said (n+1)th DC offset is greater than said (n)th DC offset.

40. The computer program product of claim 36, further comprising computer readable program code which causes said programmable computer processor to set said (n+1)th amplitude, wherein said (n+1)th amplitude is greater than said (n)th amplitude.

41. The computer program product of claim 40, further comprising computer readable program code which causes said programmable computer processor to set said (n+1) DC offset, wherein said (n+1)th DC offset is less than said (n)th DC offset.

42. The computer program product of claim 40, further comprising computer readable program code which causes said programmable computer processor to set said (n+1) DC offset, wherein said (n+1)th DC offset is greater than said (n)th DC offset.

43. The computer program product of claim 35, wherein said X/Y datapoint array comprises an actual maximum servo signal ratio and an actual minimum servo signal ratio, further comprising:

computer readable program code which causes said programmable computer processor to receive an expected maximum servo signal ratio for said X/Y datapoint array;

computer readable program code which causes said programmable computer processor to receive an expected minimum servo signal ratio for said X/Y datapoint array;

computer readable program code which causes said programmable computer processor to determine if said actual maximum servo signal substantially equals said expected maximum servo signal ratio;

computer readable program code which, if said actual maximum servo signal substantially equals said expected maximum servo signal ratio, causes said programmable computer processor determine if said actual minimum servo signal ratio substantially equals said expected minimum servo signal ratio; and computer readable program code which, if said actual minimum servo signal ratio substantially equals said expected minimum servo signal ratio, causes said programmable computer processor to form said (n)th transfer function using said X/Y datapoint array.

44. The computer program product of claim 43, wherein said wherein said actual maximum servo signal ratio does not substantially equal said expected maximum servo signal ratio, farther comprising:

computer readable program code which causes said programmable computer processor to set the (n+1)th positioning signal, wherein said (n+1)th positioning signal comprises said positioning signal frequency, the (n+1)th amplitude, and the (n+1)th DC offset;

computer readable program code which causes said programmable computer processor to move said tape head alternatingly in a first direction and an opposing second direction along a first axis as said tape moves along a second axis, wherein said first axis and said second axis are substantially orthogonal, wherein the position of said magnetic head along said first axis as a function of time is determined by said (n+1)th positioning signal;

computer readable program code which causes said programmable computer processor to form the (n+1)th measured servo signal waveform;

computer readable program code which causes said programmable computer processor to form the (n+1)th filtered servo signal waveform using said (n+1)th measured servo signal waveform;

computer readable program code which causes said programmable computer processor to form the (n+1)th measured IPS signal waveform;

computer readable program code which causes said programmable computer processor to form the (n+1)th filtered IPS signal waveform;

computer readable program code which causes said programmable computer processor to form the (n+1)th X/Y datapoint array;

computer readable program code which causes said programmable computer processor to calculate the (n+1)th transfer function; and computer readable program code which causes said programmable computer processor to save said (n+1)th transfer function.

45. The computer program product of claim 44, further comprising computer readable program code which causes said programmable computer processor to set said (n+1)th amplitude, wherein said (n+1)th amplitude is less than said (n)th amplitude.

46. The computer program product of claim 45, further comprising computer readable program code which causes said programmable computer processor to set said (n+1) DC offset, wherein said (n+1)th DC offset is less than said (n)th DC offset.

47. The computer program product of claim 45, further comprising computer readable program code which causes said programmable computer processor to set said (n+1) DC offset, wherein said (n+1)th DC offset is greater than said (n)th DC offset.

48. The computer program product of claim 44, further comprising computer readable program code which causes said programmable computer processor to set said (n+1)th amplitude, wherein said (n+1)th amplitude is greater than said (n)th amplitude.

49. The computer program product of claim 48, further comprising computer readable program code which causes said programmable computer processor to set said (n+1) DC offset, wherein said (n+1)th DC offset is less than said (n)th DC offset.

50. The computer program product of claim 48, further comprising computer readable program code which causes said programmable computer processor to set said (n+1) DC offset, wherein said (n+1)th DC offset is greater than said (n)th DC offset.

51. A computer program product usable with a programmable computer processor having computer readable program code embodied therein to calibrate a servo sensor disposed on a magnetic tape head disposed adjacent a magnetic tape moving along a tape path, wherein said magnetic tape includes at least one servo edge comprising an interface between a first recorded signal and a second recorded signal, wherein said servo sensor detects said first recorded signal and said second recorded signal, and wherein an independent position sensor provides an IPS signal comprising the lateral position of said tape head with respect to the tape path, wherein (n) is initially set to 1, comprising:

computer readable program code which causes said programmable computer processor to receive a positioning signal, wherein said positioning signal comprises a positioning signal frequency, the (n)th amplitude, and the (n)th DC offset;

computer readable program code which causes said programmable computer processor to move said tape head alternatingly in a first direction and an opposing second direction along a first axis as said tape moves along a second axis, wherein said first axis and said second axis are substantially orthogonal, wherein the position of said magnetic head along said first axis as a function of time is determined by said (n)th positioning signal;

computer readable program code which causes said programmable computer processor to receive a servo signal, wherein said servo signal comprises the ratio of the detected first recorded signal and the detected second recorded signal;

computer readable program code which causes said programmable computer processor to receive a sampling rate;

computer readable program code which causes said programmable computer processor to sample said servo signal at said sampling rate;

computer readable program code which causes said programmable computer processor to form the (n)th measured servo signal waveform;

computer readable program code which causes said programmable computer processor to receive a target maximum servo signal ratio for said (n)th measured servo signal waveform;

computer readable program code which causes said programmable computer processor to receive a target minimum servo signal ratio for said (n)th measured servo signal waveform;

computer readable program code which causes said programmable computer processor to determine if said measured maximum servo signal ratio substantially equals said target maximum servo signal ratio;

computer readable program code which, if said measured maximum servo signal ratio substantially equals said target maximum servo signal ratio, causes said programmable computer processor to determining if said measured minimum servo signal ratio substantially equals said target minimum servo signal ratio;

computer readable program code which, if said measured minimum servo signal ratio substantially equals said target minimum servo signal ratio, causes said programmable computer processor to:

use a Goertzel filter at (N) harmonics of said positioning signal frequency, the real components and the imaginary components of said (n)th measured servo signal waveform, wherein (N) is greater than or equal to 1 and less than or equal to about 6; and form the (n)th filtered servo signal waveform using said real components and said imaginary components of said (n)th measured servo signal waveform;

receive an IPS signal;

sample said IPS signal at said sampling rate;

form the (n)th measured IPS signal waveform;

compute using a Goertzel filter at (N) harmonics of said positioning signal frequency, the real components and the imaginary components of said (n)th measured IPS signal waveform;

form the (n)th filtered IPS signal waveform using said real components and said imaginary components of said (n)th measured IPS signal waveform;

form the (n)th X/Y datapoint array, wherein said X/Y datapoint array comprises an actual maximum servo signal ratio and an actual minimum servo signal ratio;

receive an expected maximum servo signal ratio for said X/Y datapoint array;

receive an target minimum servo signal ratio for said X/Y datapoint array;

determine if said actual maximum servo signal ratio substantially equals said expected maximum servo signal ratio;

computer readable program code which, if said actual maximum servo signal ratio substantially equals said expected maximum servo signal ratio causes said programmable computer processor to determine if said actual minimum servo signal ratio substantially equals said expected minimum servo signal ratio;

computer readable program code which, if said actual minimum servo signal ratio substantially equals said expected minimum servo signal ratio causes said programmable computer processor to:

calculate the (n)th transfer function;

save said (n)th transfer function.

* * * * *